United States Patent
Maehashi et al.

(10) Patent No.: US 9,407,847 B2
(45) Date of Patent: Aug. 2, 2016

(54) SOLID STATE IMAGING APPARATUS AND IMAGING SYSTEM WITH WRITING MEMORY SELECTING UNIT AND READING MEMORY SELECTING UNIT FOR OUTPUTTING SIGNALS IN AN ORDER OF SPATIAL ARRANGEMENT

(71) Applicant: CANON KABUSHIKI KAISHA, Tokyo (JP)

(72) Inventors: Yu Maehashi, Yokohama (JP); Hiroaki Kameyama, Kawasaki (JP); Hideo Kobayashi, Tokyo (JP); Kazuo Yamazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 14/591,168

(22) Filed: Jan. 7, 2015

(65) Prior Publication Data
US 2015/0215561 A1 Jul. 30, 2015

(30) Foreign Application Priority Data
Jan. 30, 2014 (JP) .................................. 2014-015734

(51) Int. Cl.
*H04N 5/3745* (2011.01)
(52) U.S. Cl.
CPC .................................. *H04N 5/3745* (2013.01)
(58) Field of Classification Search
CPC . H04N 5/3745; H04N 5/374; H04N 5/37457; H04N 5/378
See application file for complete search history.

(56) References Cited

U.S. PATENT DOCUMENTS

| 6,838,651 | B1 * | 1/2005 | Mann ................. H01L 27/14645 250/208.1 |
| 7,068,312 | B2 * | 6/2006 | Kakumoto ......... H04N 5/35518 250/208.1 |
| 7,423,790 | B2 | 9/2008 | Kochi et al. |
| 7,816,755 | B2 | 10/2010 | Yamazaki et al. |
| 7,880,786 | B2 * | 2/2011 | Muramatsu .............. H04N 3/15 348/294 |

(Continued)

FOREIGN PATENT DOCUMENTS

JP 2011-130032 6/2011

OTHER PUBLICATIONS

U.S. Appl. No. 14/469,715, filed Aug. 27, 2014.

(Continued)

*Primary Examiner* — Nicholas Giles
(74) *Attorney, Agent, or Firm* — Fitzpatrick, Cella, Harper & Scinto

(57) ABSTRACT

Provided is a solid state imaging apparatus including: a writing memory selecting unit connected between a plurality of vertical output lines and a plurality of memories, configured to selectively store a signal transmitted from at least one of the plurality of vertical output lines into at least one of the plurality of memories; a plurality of horizontal scanning channels configured to input the signals stored in the plurality of memories; and a reading memory selecting unit connected between the plurality of memories and the plurality of horizontal scanning channels, configured to selectively output the signal stored in the at least one of the plurality of memories to at least one of the plurality of horizontal scanning channels. The reading memory selecting unit is configured to output the signals in an order corresponding to spatial arrangement of photoelectric conversion elements.

10 Claims, 15 Drawing Sheets

(56) References Cited

U.S. PATENT DOCUMENTS

| | | |
|---|---|---|
| 7,990,440 B2 | 8/2011 | Kobayashi et al. |
| 8,049,799 B2 | 11/2011 | Sonoda et al. |
| 8,325,260 B2 | 12/2012 | Yamazaki et al. |
| 8,598,901 B2 | 12/2013 | Hiyama et al. |
| 8,710,558 B2 | 4/2014 | Inoue et al. |
| 8,711,259 B2 | 4/2014 | Maehashi et al. |
| 8,723,093 B2 * | 5/2014 | Krymski ............ H01L 27/14609 250/208.1 |
| 8,760,337 B2 | 6/2014 | Yamazaki |
| 8,835,828 B2 | 9/2014 | Kobayashi |
| 8,836,313 B2 | 9/2014 | Takagi et al. |
| 8,884,391 B2 | 11/2014 | Fudaba et al. |
| 8,970,757 B2 | 3/2015 | Kobayashi |
| 2001/0013571 A1 * | 8/2001 | Kakumoto ......... H04N 5/35518 250/208.1 |
| 2002/0071046 A1 * | 6/2002 | Harada ................ H04N 3/1575 348/316 |
| 2002/0101532 A1 * | 8/2002 | Takayama ............ H04N 5/2351 348/362 |
| 2005/0237408 A1 * | 10/2005 | Muramatsu ............. H04N 3/15 348/308 |
| 2008/0258042 A1 * | 10/2008 | Krymski ................ H04N 3/155 250/208.1 |
| 2009/0086084 A1 * | 4/2009 | Komaba ................ G03B 13/18 348/349 |
| 2012/0273657 A1 | 11/2012 | Kobayashi |
| 2013/0140440 A1 | 6/2013 | Kobayashi |
| 2013/0242151 A1 | 9/2013 | Yamazaki |
| 2014/0253767 A1 | 9/2014 | Kato et al. |
| 2014/0312210 A1 | 10/2014 | Kobayashi |
| 2015/0042857 A1 | 2/2015 | Kususaki et al. |

OTHER PUBLICATIONS

U.S. Appl. No. 14/591,180, filed Jan. 7, 2015.
U.S. Appl. No. 14/614,980, filed Feb. 5, 2015.
U.S. Appl. No. 14/618,143, filed Feb. 10, 2015.
U.S. Appl. No. 14/663,592, filed Mar. 20, 2015.

* cited by examiner

SOLID STATE IMAGING APPARATUS AND IMAGING SYSTEM WITH WRITING MEMORY SELECTING UNIT AND READING MEMORY SELECTING UNIT FOR OUTPUTTING SIGNALS IN AN ORDER OF SPATIAL ARRANGEMENT

BACKGROUND OF THE INVENTION

1. Field of the Invention

The present invention relates to a solid state imaging apparatus and an imaging system.

2. Description of the Related Art

Aimed at high-speed reading of pixel signals of pixels arranged in each column in a complementary metal oxide semiconductor (CMOS) image sensor designed so that a single pixel amplifier is shared by a plurality of photoelectric conversion elements, in Japanese Patent Application Laid-Open No. 2011-130032, there is disclosed a technology of simultaneously reading pixel signals in two rows with use of two vertical output lines arranged for each column of pixels.

In Japanese Patent Application Laid-Open No. 2011-130032, the following configuration is disclosed as one embodiment of an imaging element. A pixel set includes two photodiodes and two transfer switches. The pixel set further includes a single reset switch, a single pixel amplifier, and a single row selecting switch. The two photodiodes are connected to a single floating diffusion portion via the respective transfer switches, and share the reset switch, the pixel amplifier, and the row selecting switch.

In the above-mentioned configuration, two vertical output lines are arranged for each column of pixels. With this, pixel signals of two pixel sets that are consecutive in the direction along the column can be simultaneously read from the two vertical output lines. In this way, the area of the photodiodes can be secured and high-speed reading can also be attained. Note that, in the embodiment, the pixel signals are simultaneously read from two rows selected as respective rows of two consecutive pixel sets, rather than from two rows within the same pixel set.

In the configuration as described above in which the pixel signals are simultaneously read from two vertical output lines, the order of the reading may fail to match with the actual spatial arrangement of pixels. In the above-mentioned technology, the pixel signals are not read as indicated by spatial information. In addition, also in another configuration in which a single photoelectric conversion element is arranged for a single pixel amplifier, the pixel signals may fail to be read as indicated by spatial information. It is accordingly necessary to sort the pixel signals as indicated by the spatial information with use of an external digital signal processing circuit.

SUMMARY OF THE INVENTION

According to one embodiment of the present invention, there is provided a solid state imaging apparatus, including: a pixel portion comprising a plurality of unit pixels arranged in matrix, the plurality of unit pixels each comprising a photoelectric conversion element; a plurality of vertical output lines arranged for each column of the pixel portion, configured to transmit signals output from the photoelectric conversion elements, a plurality of memories configured to store the signals output from the photoelectric conversion elements; a writing memory selecting unit connected between the plurality of vertical output lines and the plurality of memories, configured to selectively store a signal transmitted from at least one of the plurality of vertical output lines into at least one of the plurality of memories; a plurality of horizontal scanning channels configured to input the signals stored in the plurality of memories; and a reading memory selecting unit connected between the plurality of memories and the plurality of horizontal scanning channels, configured to selectively output the signal stored in the at least one of the plurality of memories to at least one of the plurality of horizontal scanning channels. The reading memory selecting unit is configured to output the signals in an order corresponding to spatial arrangement of the photoelectric conversion elements.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Like components are denoted by like reference symbols throughout the drawings, and descriptions of overlapping components are sometimes omitted.

First Embodiment

Figure 1:
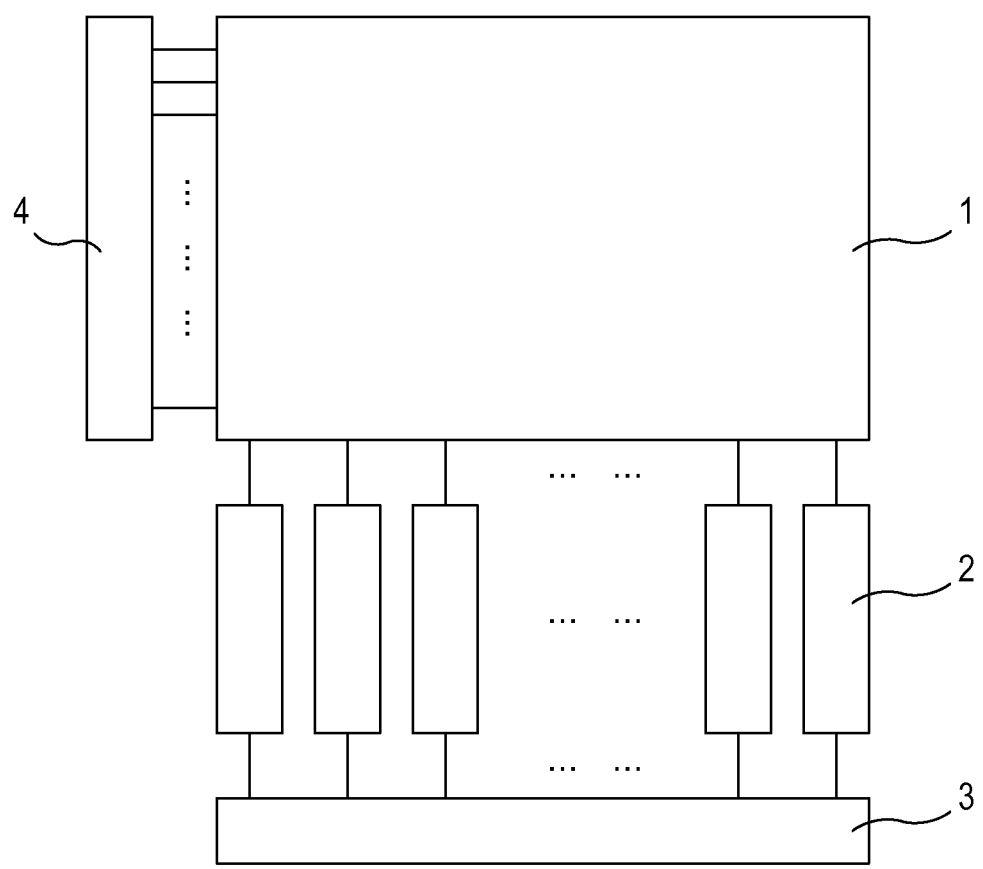
FIG. 1 is a diagram illustrating an exemplary configuration of a solid state imaging apparatus according to a first embodiment of the present invention.

FIG. 1 is a schematic diagram illustrating an exemplary circuit configuration of a solid state imaging apparatus according to a first embodiment of the present invention. The solid state imaging apparatus includes a pixel portion 1, signal processing units 2, a horizontal scanning circuit 3, and a vertical scanning circuit 4.

The pixel portion 1 includes a plurality of unit pixels arranged in matrix. The signal processing units 2 are connected to the unit pixels in respective columns of the pixel portion 1 so as to read signals from the respective columns, and each include a memory unit for storing the read signals. The horizontal scanning circuit 3 is connected to the signal processing units 2 so as to selectively read the signals stored in the signal processing units 2. The vertical scanning circuit 4 is connected to the unit pixels in respective rows of the pixel portion 1 so as to perform processing such as the selection of a pixel from which the signal is to be read.

Figure 2:
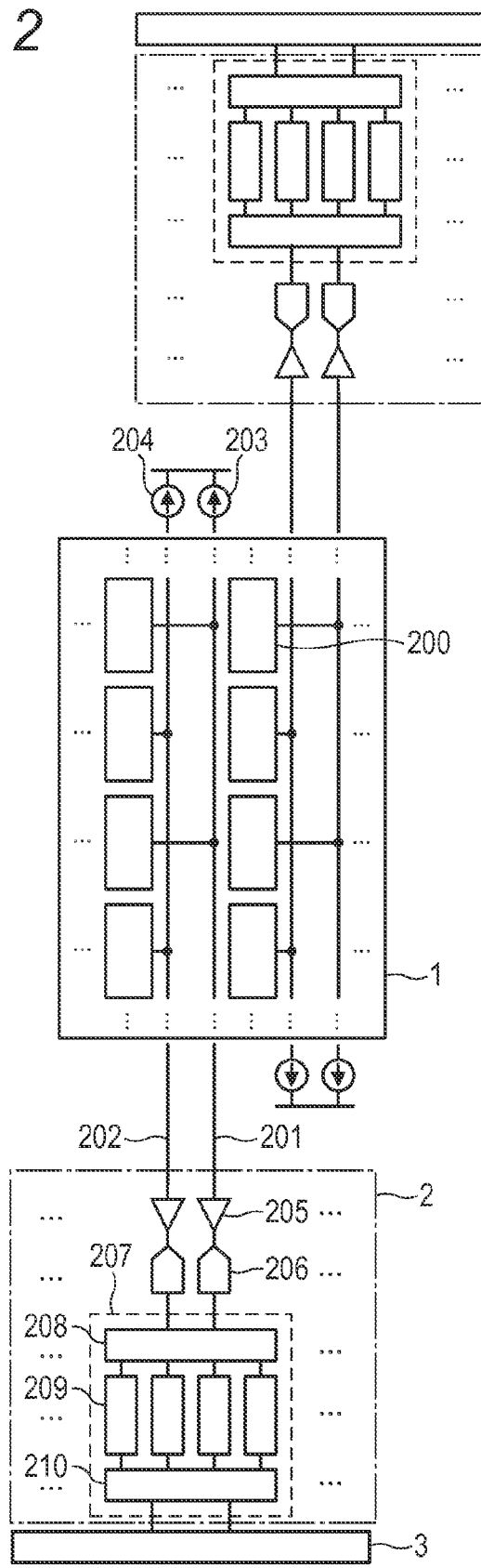
FIG. 2 is a diagram illustrating exemplary configurations of a pixel portion and a signal processing unit according to the first embodiment of the present invention.

FIG. 2 is a schematic diagram illustrating exemplary configurations of the pixel portion 1 and the signal processing unit 2 according to the first embodiment of the present invention. The pixel portion 1 includes unit pixels 200, and two vertical output lines 201 and 202 connected to each column of the unit pixels 200.

Outputs of the unit pixels 200 in the same column are connected to the vertical output lines 201 and 202 and constant current sources 203 and 204. The vertical output lines 201 and 202 are connected to the signal processing unit 2. The signal processing unit 2 includes amplifiers 205, analog-to-digital (AD) converters 206, and a memory portion 207. The amplifier 205 and the AD converter 206 are connected to each of the vertical output lines 201 and 202.

The amplifier 205 amplifies a pixel signal output to the corresponding vertical output line, and outputs the amplified pixel signal to the AD converter 206. The AD converter 206 AD-converts the amplified pixel signal, and outputs the converted signal to the memory portion 207 as digital data.

The memory portion 207 includes a writing memory selecting unit 208, a plurality of memories 209 connected in parallel, and a reading memory selecting unit 210. The memory portion 207 has the function of holding pixel signals as digital data.

Herein, each unit only needs to have a switching function or an amplifying function, and can be formed of a transistor such as a metal oxide semiconductor field effect transistor (MOSFET), for example. The following description assumes that each unit is an FET having gate, source, and drain terminals.

The writing memory selecting unit 208 is configured to select which of the memories 209 is used to store digital data input to the memory portion 207.

The plurality of memories 209 are connected between the writing memory selecting unit 208 and the reading memory selecting unit 210. The number of memories 209 connected in parallel is equal to or larger than the number of vertical output lines connected to the signal processing unit. In this embodiment, four memories 209 are connected in parallel with respect to the two vertical output lines 201 and 202. Each memory 209 is capable of storing two kinds of signals, that is, a reset signal N containing a noise component generated in a pixel, and a photoelectric conversion signal S having noise corresponding to the reset signal N superimposed thereon. Subtraction processing of (S−N) may be performed outside the solid state imaging apparatus, or the function therefor may be included in the solid state imaging apparatus, such as in the memory 209. In a case where the subtraction processing of (S−N) is performed on the upstream side of the memory 209, the memory 209 may be configured to store only one kind of data.

The reading memory selecting unit 210 has the function of selecting any one of the memories 209 from which a signal is to be read. The reading of the signal from the reading memory selecting unit 210 is controlled by the horizontal scanning circuit 3.

The above-mentioned series of operations relating to the reading of pixel signals from pixels to the vertical output line is performed while the vertical scanning circuit 4 appropriately selects a pixel row of the pixel portion 1. Note that, each circuit is controlled by a pulse signal transmitted from a timing control unit (not shown) that is separately provided.

Note that, the unit pixels 200 and the vertical output lines 201 and 202 illustrated in FIG. 2 have the relationship that two vertical output lines are connected to each column of pixels. However, the relationship between the number of columns of pixels and the number of vertical output lines is not limited thereto, and it is only necessary that a plurality of vertical output lines be connected to each column of pixels.

In the signal processing unit 2 of FIG. 2, one amplifier 205 and one AD converter 206 are connected to each of the two vertical output lines, and the memory portion 207 including the four memories 209 is connected to the two AD converters 206. However, the signal processing unit 2 is not limited to this configuration, and the amplifier 205 and the AD converter 206 are not essential components. In other words, the vertical output line may be connected directly to the AD converter 206, or the vertical output line may be connected to the memory portion 207 not via the AD converter 206 as an analog signal without any conversion.

Figure 3:
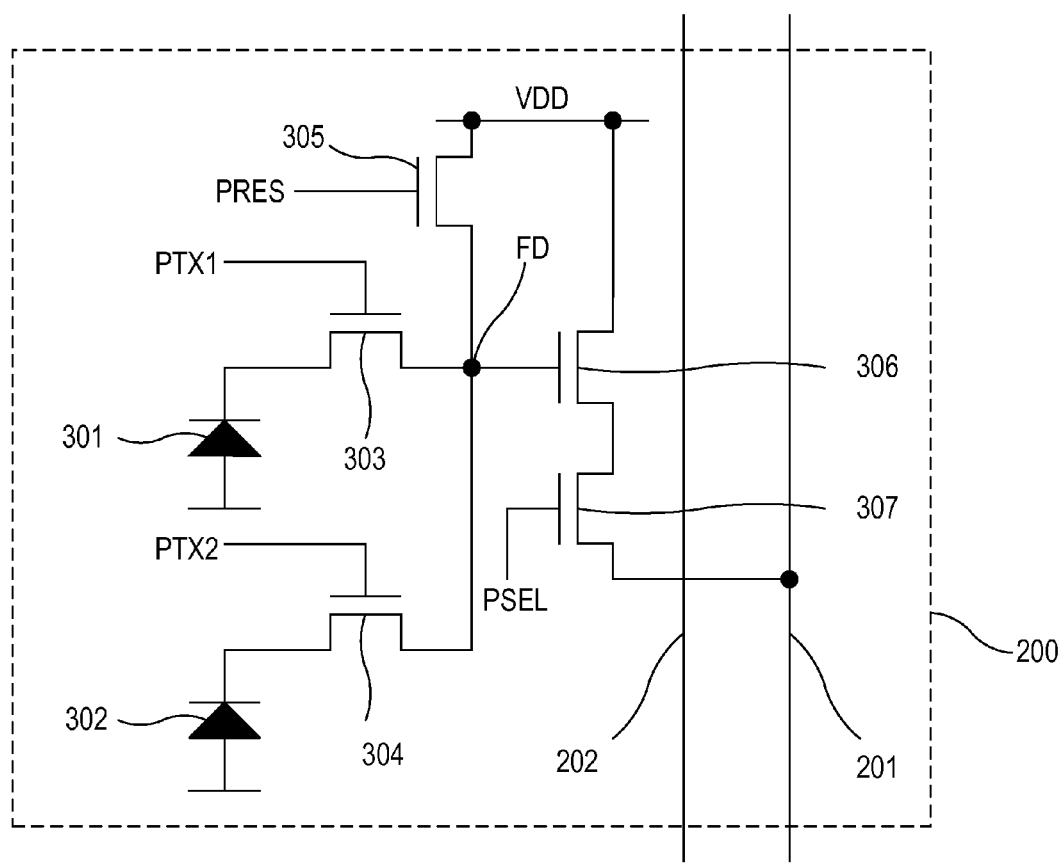
FIG. 3 is a diagram illustrating an exemplary configuration of a unit pixel according to the first embodiment of the present invention.

FIG. 3 is a diagram illustrating an exemplary configuration of the unit pixel according to the first embodiment. The unit pixel 200 includes two photoelectric conversion elements 301 and 302, electric charge transfer units 303 and 304, a floating diffusion portion FD, a resetting unit 305, a pixel signal amplifying unit 306, and a row selecting unit 307.

Each of the photoelectric conversion elements 301 and 302 includes an element such as a photodiode for generating electric charge corresponding to intensity of detected light through photoelectric conversion. The electric charge transfer units 303 and 304 are connected between the photoelectric conversion elements 301 and 302 and the common floating diffusion portion FD, respectively. As used herein, the common floating diffusion portion means a common node, which means that "the electric charge transfer units 303 and 304 are connected to a common pixel amplifying portion". For example, in a case where the solid state imaging apparatus is formed on a semiconductor substrate, a plurality of diffusion regions may be used to form a single floating diffusion portion.

Alternatively, a common microlens may be provided for the plurality of photoelectric conversion elements 301 included in the unit pixel 200. This configuration can acquire phase difference information to perform focus detection.

The electric charge transfer units 303 and 304 are transfer transistors for reading the electric charge accumulated in the photoelectric conversion elements 301 and 302, respectively, and are controlled to be conductive/non-conductive (on/off) by pixel transfer signals PTX1 and PTX2, respectively.

The resetting unit 305 is connected between a power supply voltage VDD and the floating diffusion portion FD. The resetting unit 305 is a reset transistor for resetting the circuit by supplying the power supply voltage VDD to the floating diffusion portion FD, and is controlled to be conductive/non-conductive (on/off) by a pixel portion reset signal PRES.

The pixel signal amplifying unit 306 has a gate terminal connected to the floating diffusion portion FD, a drain terminal connected to the power supply voltage VDD, and a source terminal connected to the row selecting unit 307. The pixel signal amplifying unit 306 is a source follower transistor for amplifying a voltage obtained by the electric charge accumulated in the floating diffusion portion FD to output the amplified voltage to the vertical output line 201 or 202 as a signal voltage.

The row selecting unit 307 is a row selecting transistor for controlling the connection between the output of the pixel signal amplifying unit 306 and the vertical output line 201 or 202 to select a row from which signals of two-dimensionally arranged pixels are to be output. The row selecting unit 307 is controlled to be conductive/non-conductive (on/off) by a row selecting signal PSEL.

In the unit pixel 200 illustrated in FIG. 3, the two photoelectric conversion elements share the single floating diffusion portion FD, but the unit pixel 200 is not limited thereto. A larger number of photoelectric conversion elements may or may not share the single floating diffusion portion FD.

Figure 4:
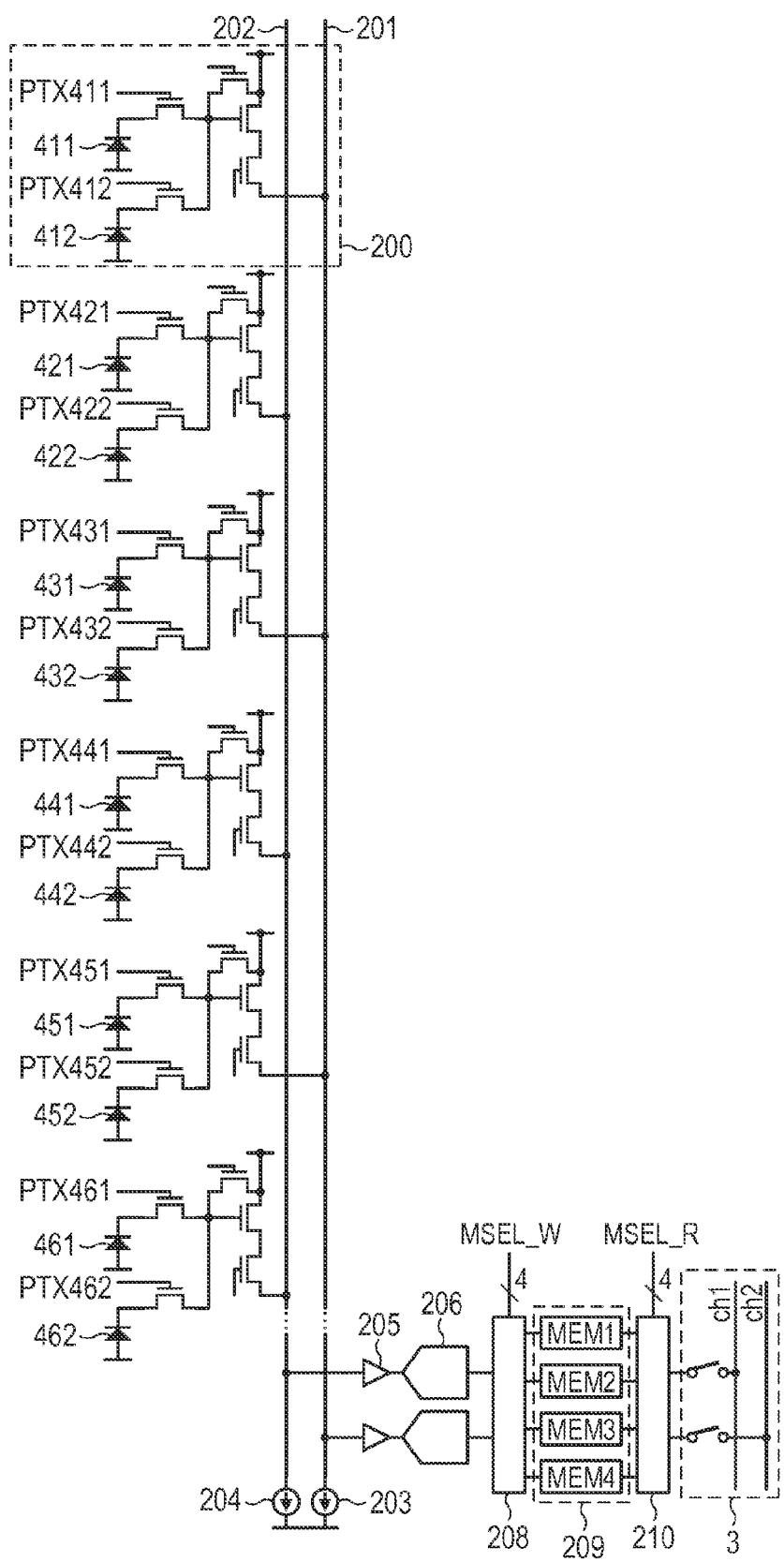
FIG. 4 is a diagram illustrating an exemplary circuit for describing drive timings according to the first embodiment of the present invention.

FIG. 4 is a diagram illustrating an exemplary circuit for describing drive timings according to the first embodiment of the present invention. FIG. 4 illustrates only parts necessary for the description of the drive timings, among components of one column of the pixel portion 1, the signal processing unit 2 for that column, and the horizontal scanning circuit 3. In the circuit of FIG. 4, photoelectric conversion elements 411 and 412 share a single floating diffusion portion FD, and are connected to the vertical output line 201. Photoelectric conversion elements 421 and 422 share a single floating diffusion portion FD, and are connected to the vertical output line 202. Similarly, photoelectric conversion elements included in odd-numbered unit pixels from the top are connected to the vertical output line 201, and photoelectric conversion elements included in even-numbered unit pixels are connected to the vertical output line 202. Likewise, FIG. 4 exemplifies twelve photoelectric conversion elements 411 to 462 in total. Pixel transfer units connected to the respective photoelectric conversion elements 411 to 462 are controlled to be conductive/non-conductive (on/off) by pixel transfer signals PTX411 to PTX462.

The writing memory selecting unit 208 has the function of selectively transmitting a signal between the vertical output line 201 or 202 and each memory. The connection relationship between the vertical output line and the memory is controlled by writing memory selecting signals MSEL_W1 to MSEL_W4. The writing memory selecting unit 208 can be constructed by, for example, switches each having one or more input terminals and one or more output terminals. Similarly, the reading memory selecting unit 210 also has the function of selectively transmitting a signal between each memory and the horizontal scanning circuit, and is controlled by reading memory selecting signals MSEL_R1 to MSEL_R4. The horizontal scanning circuit 3 has two horizontal scanning channels ch1 and ch2. The signal input from the reading memory selecting unit 210 is output to the horizontal scanning channel ch1 or ch2.

Figure 5:
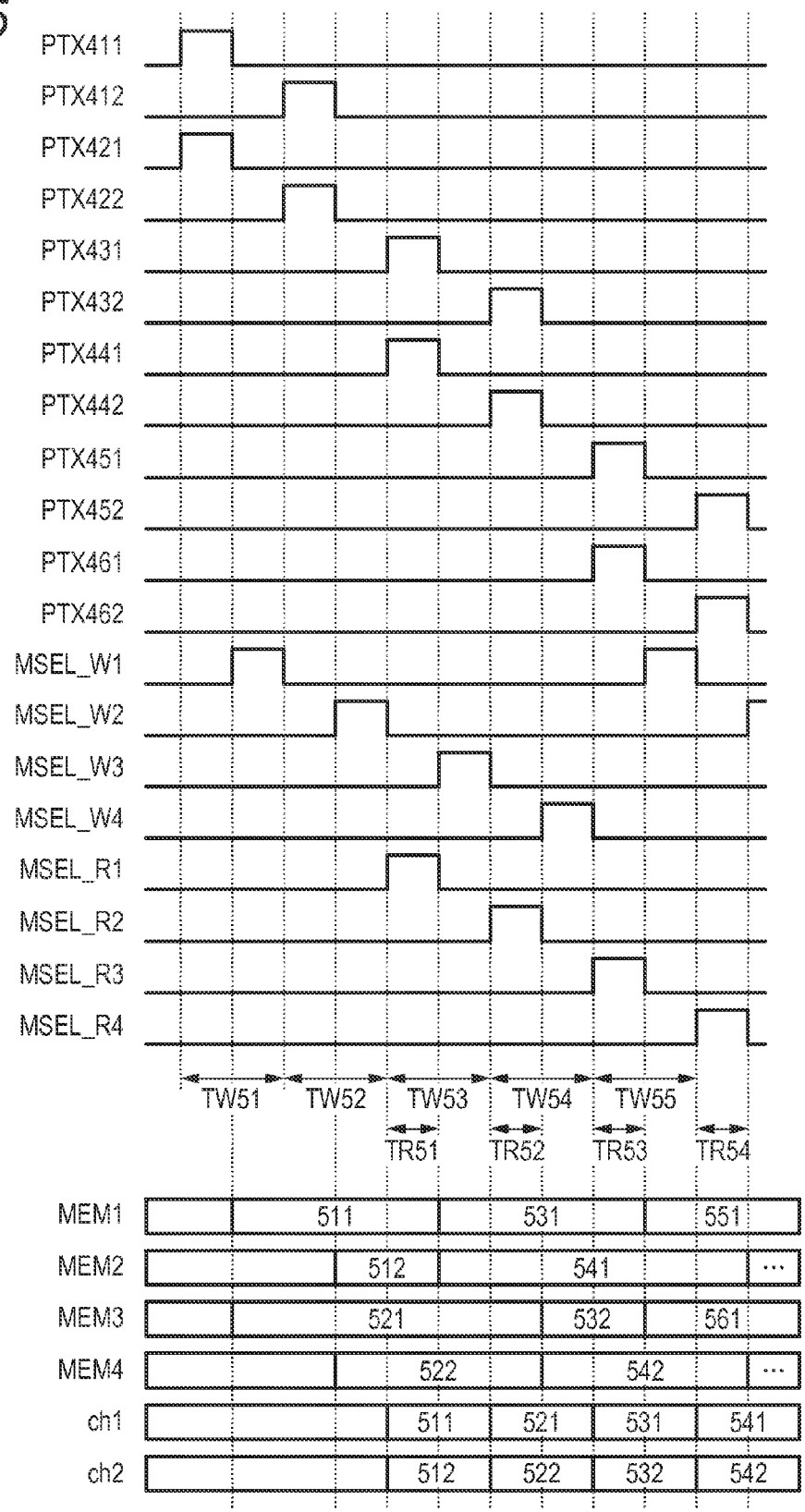
FIG. 5 is a diagram illustrating the drive timings according to the first embodiment of the present invention.

FIG. 5 is a timing chart illustrating drive timings according to this embodiment. In FIG. 5, MEM1 to MEM4 and the horizontal scanning channels ch1 and ch2 represent a transition diagram illustrating a transition of a data-occupied period in the memories 209 and the output channels. Reference symbols 511 to 561 described in the transition diagram represent pixel signals corresponding to the photoelectric conversion elements 411 to 461 of FIG. 4, respectively. In other words, the last two digits of the reference symbols represent the correspondence relationship between the pixel signal and the photoelectric conversion element, in a manner that reference symbol 511 described in the transition diagram represents the pixel signal output from the photoelectric conversion element 411. A section 511 described in the row of MEM1 indicates that the signal 511 based on photoelectric charge of the photoelectric conversion element 411 of FIG. 4 is occupied (held) in MEM1 of the memory 209. Note that, in FIGS. 4 and 5, the pixel portion reset signal PRES and the row selecting signal PSEL are omitted for simplicity.

Table 1 shows correspondence relationships of the selection of MEM1 to MEM4 for storing signals from the vertical output lines 201 and 202 controlled by MSEL_W1 to MSEL_W4 and the reading of signals from MEM1 to MEM4 to ch1 and ch2 controlled by MSEL_R1 to MSEL_R4 according to this embodiment. Note that, a plurality of pieces of processing are shown as the processing of signal writing or reading in correspondence with the respective control signals, which means that all operations of the pieces of processing are performed.

TABLE 1

| Control signal | Contents of control |
| --- | --- |
| MSEL_W1 | Write signal of vertical output line 201 into MEM1 |
| | Write signal of vertical output line 202 into MEM3 |
| MSEL_W2 | Write signal of vertical output line 201 into MEM2 |
| | Write signal of vertical output line 202 into MEM4 |
| MSEL_W3 | Write signal of vertical output line 201 into MEM1 |
| | Write signal of vertical output line 202 into MEM2 |
| MSEL_W4 | Write signal of vertical output line 201 into MEM3 |
| | Write signal of vertical output line 202 into MEM4 |
| MSEL_R1 | Read signal of MEM1 to ch1 |
| | Read signal of MEM2 to ch2 |
| MSEL_R2 | Read signal of MEM3 to ch1 |
| | Read signal of MEM4 to ch2 |
| MSEL_R3 | Read signal of MEM1 to ch1 |
| | Read signal of MEM3 to ch2 |
| MSEL_R4 | Read signal of MEM2 to ch1 |
| | Read signal of MEM4 to ch2 |

Next, the operation in this embodiment in which two unit pixels 200 are simultaneously driven so that data is written from the two unit pixels 200 into the memory 209 and then the data is read in the order different from the order of the writing is described with reference to the timing chart of FIG. 5. Note that, in the description herein, the electric charge transfer unit and the like are configured to be conductive/non-conductive (on/off) so as to be turned on when the signals illustrated in the timing chart are High and off when the signals are Low.

In a period TW51, PTX411 and PTX421 become High so that the pixel signals 511 and 521 are read from the photoelectric conversion elements 411 and 421, respectively. At this time, the writing memory selecting signal MSEL_W1 becomes High so that the pixel signal 511 is written into MEM1 and the pixel signal 521 is written into MEM3.

In a period TW52, PTX412 and PTX422 become High so that the pixel signals 512 and 522 are read from the photoelectric conversion elements 412 and 422, respectively. At this time, the writing memory selecting signal MSEL_W2 becomes High so that the pixel signal 512 is written into MEM2 and the pixel signal 522 is written into MEM4.

In a period TR51, the reading memory selecting signal MSEL_R1 becomes High so that the pixel signal 511 is read from MEM1 and the pixel signal 512 is read from MEM2.

In a period TW53, PTX431 and PTX441 become High so that the pixel signals 531 and 541 are read from the photoelectric conversion elements 431 and 441, respectively. At this time, the writing memory selecting signal MSEL_W3 becomes High so that the pixel signal 531 is written into MEM1 and the pixel signal 541 is written into MEM2.

In a period TR52, the reading memory selecting signal MSEL_R2 becomes High so that the pixel signal 521 is read from MEM3 and the pixel signal 522 is read from MEM4.

In a period TW54, PTX432 and PTX442 become High so that the pixel signals 532 and 542 are read from the photoelectric conversion elements 432 and 442, respectively. At this time, the writing memory selecting signal MSEL_W4 becomes High so that the pixel signal 532 is written into MEM3 and the pixel signal 542 is written into MEM4.

In a period TR53, the reading memory selecting signal MSEL_R3 becomes High so that the pixel signal 531 is read from MEM1 and the pixel signal 532 is read from MEM3.

In a period TW55, PTX451 and PTX461 become High so that the pixel signals 551 and 561 are read from the photoelectric conversion elements 451 and 461, respectively. At this time, the writing memory selecting signal MSEL_W1 becomes High so that the pixel signal 551 is written into MEM1 and the pixel signal 561 is written into MEM3.

In a period TR54, the reading memory selecting signal MSEL_R4 becomes High so that the pixel signal 541 is read from MEM2 and the pixel signal 542 is read from MEM4.

Note that, the timing chart of FIG. 5 is a schematic diagram for describing this embodiment, and is not intended to limit the actual timings of pulses for controlling the memory portion 207. For example, in this embodiment, the timings at which the pixel transfer signal PTX and the reading memory selecting signal MSEL_R become High are matched with each other. This configuration can improve the frame rate. However, it is not essential to match the timings in this embodiment, and the timings may be shifted from each other.

In this embodiment, pixel signals are read from the pixel portion 1 in the following order. First, signals are simultaneously read from the photoelectric conversion elements 411 and 421. Second, signals are simultaneously read from the photoelectric conversion elements 412 and 422. Third, signals are simultaneously read from the photoelectric conversion elements 431 and 441. Fourth, signals are simultaneously read from the photoelectric conversion elements 432 and 442. In this way, signals are simultaneously read from two rows of the vertical output lines 201 and 202, and hence the reading is performed at high speed.

If the pixel signals are read from the memory portion 207 to the horizontal scanning circuit 3 in the same order as the reading from the pixel portion 1 without applying the circuit and the drive method therefor according to this embodiment, the spatial arrangement is in the same order as that described above. Specifically, the pixel signals are read in the order of the pixel signals 511 and 521, the pixel signals 512 and 522, the pixel signals 531 and 541, and the pixel signals 532 and 542. On the other hand, the spatial arrangement of pixels illustrated in FIG. 4 is in the order of 411, 412, 421, 422, 431, 432, 441, and 442 from the top. In other words, the order of reading differs from the spatial arrangement of pixels.

On the other hand, in the case where the circuit and the drive method therefor according to this embodiment are applied, the signals are read in the following order. First, the pixel signals 511 and 512 are simultaneously read. Second, the pixel signals 521 and 522 are simultaneously read. Third, the pixel signals 531 and 532 are simultaneously read. Fourth, the pixel signals 541 and 542 are simultaneously read. Thus, the order of reading matches with the spatial arrangement of pixels as follows. Specifically, the pixel signals are read in the order of the pixel signals 511 and 512, the pixel signals 521 and 522, the pixel signals 531 and 532, and the pixel signals 541 and 542.

Consequently, the order of signals to be read can match with the spatial arrangement of pixels while high-speed reading is maintained by simultaneous reading of two signals as described above.

In some imaging systems including a solid state imaging apparatus, image processing, such as development, correction, and interpolation, is performed on pixel signals in the order of spatial arrangement particularly in the column direction. The solid state imaging apparatus according to this embodiment is capable of supplying pixel signals to a downstream circuit in the order of spatial arrangement, that is, in the order of processing.

Herein, the reading of signals so that the order of reading may match with the order of spatial arrangement (including simultaneous reading) is expressed as "reading as indicated by spatial information". In other words, the reading of a signal from the pixel 421 prior to the pixel 412 as in the above-mentioned example in which the embodiment is not applied is expressed as "fail to be read as indicated by spatial information".

According to this embodiment, through the switching of the order of writing and reading into and from the memories 209 in the memory portion 207, the signals output from the pixel portion 1 can be read as indicated by spatial information and be output to the horizontal scanning circuit 3.

Further, in this embodiment, the memories 209 for switching the order of reading are arranged on the upstream side of a column memory (not shown) for storing signals that are read for each column by the horizontal scanning circuit 3 (on the side closer to the photoelectric conversion element for generating a signal). This configuration can reduce the number of memories arranged in the entire imaging system as compared with when the memories 209 are arranged on the downstream side of the column memory, and hence the apparatus can be downsized and the cost efficiency can be improved. In addition, because a small number of memories are needed, the apparatus can be driven at low speed to reduce power consumption.

Still further, as described above, the embodiment can be modified so that the AD converter 206 is arranged on the downstream side of the memory portion 207, and in this case, the pixel signals read from the vertical output lines 201 and 202 may be written and held in the memories 209 as analog signals without any conversion. However, the analog signal held in the memory or the like can be deteriorated due to noise or leakage current. Thus, in this embodiment in which the signal is held in the memory for a longer period of time than hitherto, it is more preferred to hold a digital signal, which is less deteriorated due to noise or leakage current as compared with an analog signal.

This embodiment has exemplified the case where two photoelectric conversion elements are arranged for a single pixel amplifier, and two vertical output lines are provided. The above description has shown that this configuration achieves high-speed reading due to the plurality of vertical output lines and enables the signals to be read as indicated by spatial arrangement. This embodiment, however, can be modified as appropriate to be applicable to other configurations having different numbers of photoelectric conversion elements and vertical output lines. Examples thereof are described in the following embodiments.

Second Embodiment

Next, a second embodiment of the present invention is described. A solid state imaging apparatus according to this embodiment is the same as the solid state imaging apparatus according to the first embodiment described above, except for the configuration of the pixel portion, the configuration of the memory portion, and the drive method. Thus, parts that are different from the first embodiment are described below.

Figure 6:
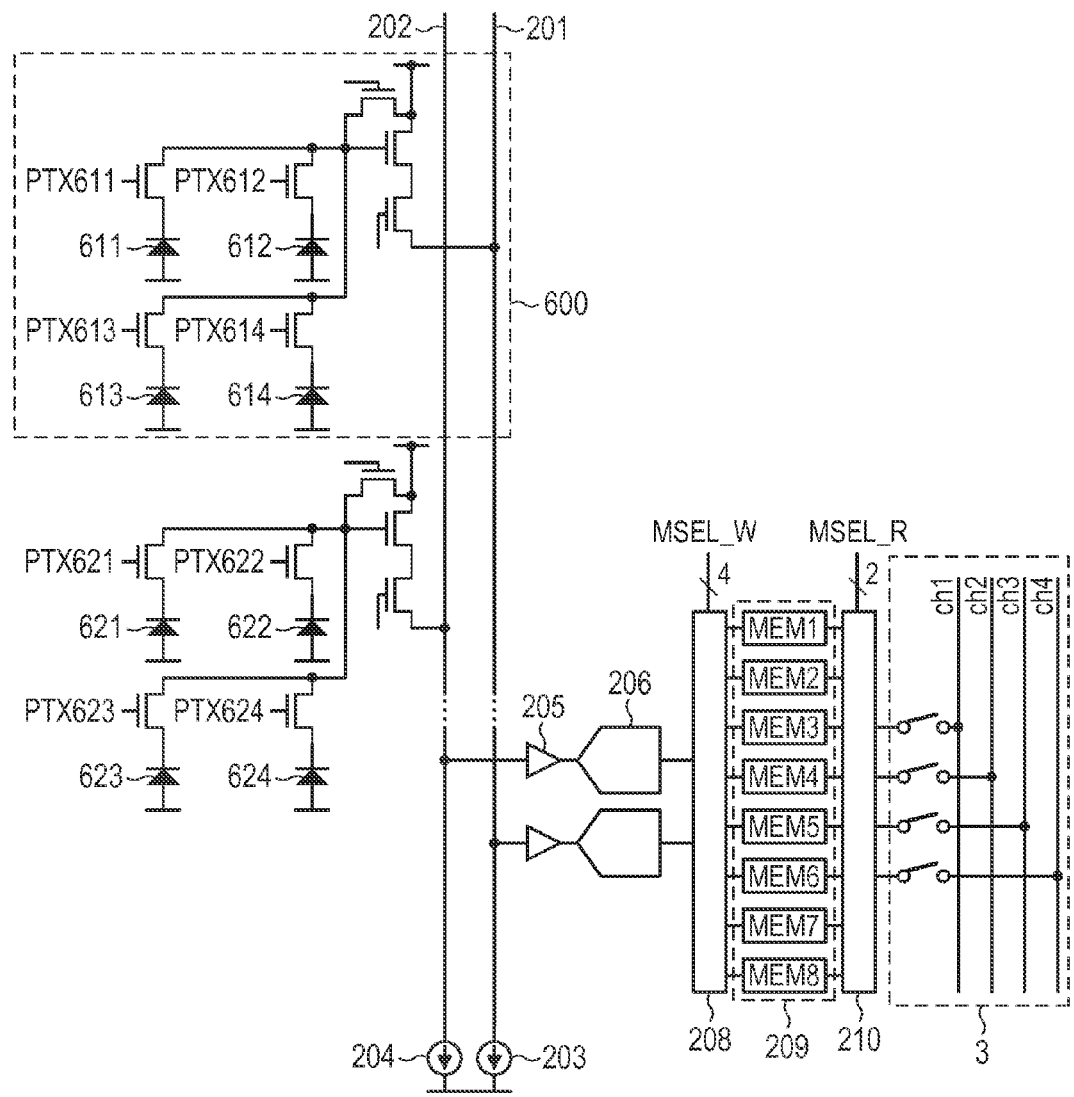
FIG. 6 is a diagram illustrating an exemplary circuit for describing drive timings according to a second embodiment of the present invention.

FIG. 6 is a diagram illustrating an exemplary circuit for describing drive timings according to the second embodiment. In a unit pixel 600, four photoelectric conversion elements 611, 612, 613, and 614 in total in two rows and two columns share a single floating diffusion portion FD, and are connected to the vertical output line 201. In the direction along the row of the photoelectric conversion element 611 (horizontal direction), the photoelectric conversion element 612 is arranged adjacent to the photoelectric conversion element 611. In the direction along the column of the photoelectric conversion element 611 (vertical direction), the photoelectric conversion element 613 is arranged adjacent to the photoelectric conversion element 611. Similarly, four photoelectric conversion elements 621, 622, 623, and 624 in total in two rows and two columns share a single floating diffusion portion FD, and are connected to the vertical output line 202. FIG. 6 exemplifies the eight photoelectric conversion elements 611 to 624 in total. Pixel transfer units, which are connected to the respective photoelectric conversion elements 611 to 624, are controlled to be conductive/non-conductive (on/off) by respective pixel transfer signals PTX611 to PTX624.

Eight memories 209 (MEM1 to MEM8) are mounted for every two columns of unit pixels. Four reading lines are connected from the memory portion 207 to the horizontal scanning circuit 3, which are connected to ch1 to ch4, respectively.

Figure 7:
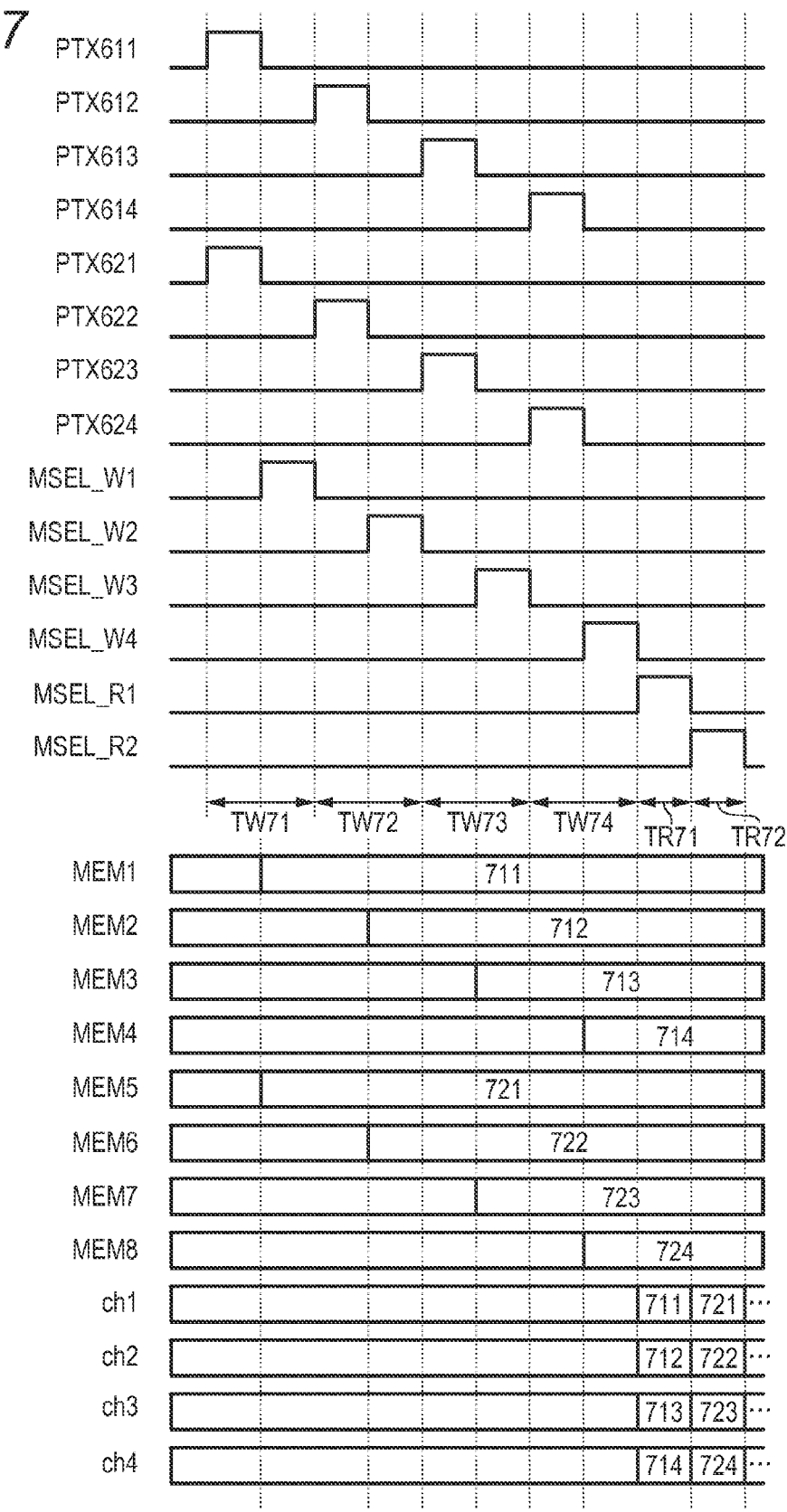
FIG. 7 is a diagram illustrating the drive timings according to the second embodiment of the present invention.

FIG. 7 is a timing chart illustrating the drive timings according to this embodiment. The drive timings are represented in the same manner as in the first embodiment. Numbers 711 to 724 described in a transition diagram of MEM1 to MEM8 and the horizontal scanning channels ch1 to ch4 represent pixel signals corresponding to the photoelectric conversion elements 611 to 624 of FIG. 6, respectively. Note that, in FIGS. 6 and 7, the pixel portion reset signal PRES and the pixel selecting signal PSEL are omitted for simplicity. Note that, the timing chart of FIG. 7 is a schematic diagram for describing this embodiment, and is not intended to limit the actual timings of pulses for controlling the memory portion 207.

Table 2 shows correspondence relationships of the selection of MEM1 to MEM8 for storing signals from the vertical output lines 201 and 202 controlled by MSEL_W1 to MSEL_W4 and the reading of signals from MEM1 to MEM8 to ch1 and ch4 controlled by MSEL_R1 and MSEL_R2 according to this embodiment. Note that, a plurality of pieces of processing are shown as the processing of signal writing or reading in correspondence with the respective control signals, which means that all operations of the pieces of processing are performed.

TABLE 2

| Control signal | Contents of control |
| --- | --- |
| MSEL_W1 | Write signal of vertical output line 201 into MEM1 |
|  | Write signal of vertical output line 202 into MEM5 |
| MSEL_W2 | Write signal of vertical output line 201 into MEM2 |
|  | Write signal of vertical output line 202 into MEM6 |
| MSEL_W3 | Write signal of vertical output line 201 into MEM3 |
|  | Write signal of vertical output line 202 into MEM7 |
| MSEL_W4 | Write signal of vertical output line 201 into MEM4 |
|  | Write signal of vertical output line 202 into MEM8 |
| MSEL_R1 | Read signal of MEM1 to ch1 |
|  | Read signal of MEM2 to ch2 |
|  | Read signal of MEM3 to ch3 |
|  | Read signal of MEM4 to ch4 |
| MSEL_R2 | Read signal of MEM5 to ch1 |
|  | Read signal of MEM6 to ch2 |
|  | Read signal of MEM7 to ch3 |
|  | Read signal of MEM8 to ch4 |

In a period TW71, PTX611 and PTX621 become High so that the pixel signals 711 and 721 are read from the photoelectric conversion elements 611 and 621, respectively. At this time, the writing memory selecting signal MSEL_W1 becomes High so that the pixel signal 711 is written into MEM1 and the pixel signal 721 is written into MEM5.

In a period TW72, PTX612 and PTX622 become High so that the pixel signals 712 and 722 are read from the photoelectric conversion elements 612 and 622, respectively. At this time, the writing memory selecting signal MSEL_W2 becomes High so that the pixel signal 712 is written into MEM2 and the pixel signal 722 is written into MEM6.

In a period TW73, PTX613 and PTX623 become High so that the pixel signals 713 and 723 are read from the photoelectric conversion elements 613 and 623, respectively. At this time, the writing memory selecting signal MSEL_W3 becomes High so that the pixel signal 713 is written into MEM3 and the pixel signal 723 is written into MEM7.

In a period TW74, PTX614 and PTX624 become High so that the pixel signals 714 and 724 are read from the photoelectric conversion elements 614 and 624, respectively. At this time, the writing memory selecting signal MSEL_W4 becomes High so that the pixel signal 714 is written into MEM4 and the pixel signal 724 is written into MEM8.

In a period TR71, the reading memory selecting signal MSEL_R1 becomes High so that the pixel signal 711 is read from MEM1, the pixel signal 712 is read from MEM2, the pixel signal 713 is read from MEM3, and the pixel signal 714 is read from MEM4.

In a period TR72, the reading memory selecting signal MSEL_R2 becomes High so that the pixel signal 721 is read from MEM5, the pixel signal 722 is read from MEM6, the pixel signal 723 is read from MEM7, and the pixel signal 724 is read from MEM8.

In this embodiment, pixel signals are read from the pixel portion 1 in the following order. First, signals are simultaneously read from the photoelectric conversion elements 611 and 621. Second, signals are simultaneously read from the photoelectric conversion elements 612 and 622. Third, signals are simultaneously read from the photoelectric conversion elements 613 and 623. Fourth, signals are simultaneously read from the photoelectric conversion elements 614 and 624. Similarly to the first embodiment, signals are simultaneously read from two rows of the vertical output lines 201 and 202, and hence the reading is performed at high speed.

On the other hand, pixel signals are read from the memory portion to the horizontal scanning circuit in the following order. First, the pixel signals 711, 712, 713, and 714 are simultaneously read. Second, the pixel signals 721, 722, 723, and 724 are simultaneously read. Thus, the signals are read from every unit pixel also in this embodiment.

Specifically, the order of signals to be read can match with the spatial arrangement of pixels while high-speed reading is maintained by simultaneous reading of two signals as described above.

In some imaging systems including a solid state imaging apparatus, image processing, such as development, correction, and interpolation, is performed on pixel signals in the order of spatial arrangement particularly in the column direction. The solid state imaging apparatus according to this embodiment is capable of supplying pixel signals in the order of spatial arrangement, that is, in the order of processing.

Specifically, in FIG. 6, the order of writing and reading into and from the memories 209 can be switched in the memory portion 207 so that signals are read from the photoelectric conversion elements 611, 612, 613, 614, 621, 622, 623, 624, . . . in this order (including simultaneous reading). As a result, the pixel signals output from the photoelectric conversion elements 611, 612, 613, and 614 are simultaneously read, and thereafter the pixel signals output from the photoelectric conversion elements 621, 622, 623, and 624 are simultaneously read, that is, the reading as indicated by spatial information is realized.

Further, in this embodiment, when color filters of a plurality of colors each configured to transmit light with a particular wavelength are provided on photoelectric conversion elements, color imaging can be achieved. The pattern of the color filters on the photoelectric conversion elements may be, for example, a Bayer arrangement in which four elements of R (red pixel), G (green pixel), G, and B (blue pixel) arranged in a square of 2×2 are one unit. In this case, for example, by arranging the photoelectric conversion element 611 for R, the photoelectric conversion elements 612 and 613 for G, and the photoelectric conversion element 614 for B, signals are read in units of developing processing. However, the color filters may have another pattern as long as a plurality of pixels as one unit are repeated, and in this case, the same effect can be obtained by modifying this embodiment so that the signals in one unit may be read as a group. Note that, the above-mentioned "reading of signals in one unit as a group" means that consecutive signals from unit pixels in a certain unit contain no signals from unit pixels in another unit in the order of reading.

Third Embodiment

Next, a third embodiment of the present invention is described. A solid state imaging apparatus according to this embodiment is the same as the solid state imaging apparatus according to the first embodiment described above, except for the configuration of the pixel portion, the configuration of the memory portion, and the drive method. Thus, parts that are different from the first embodiment are described below.

Figure 8:
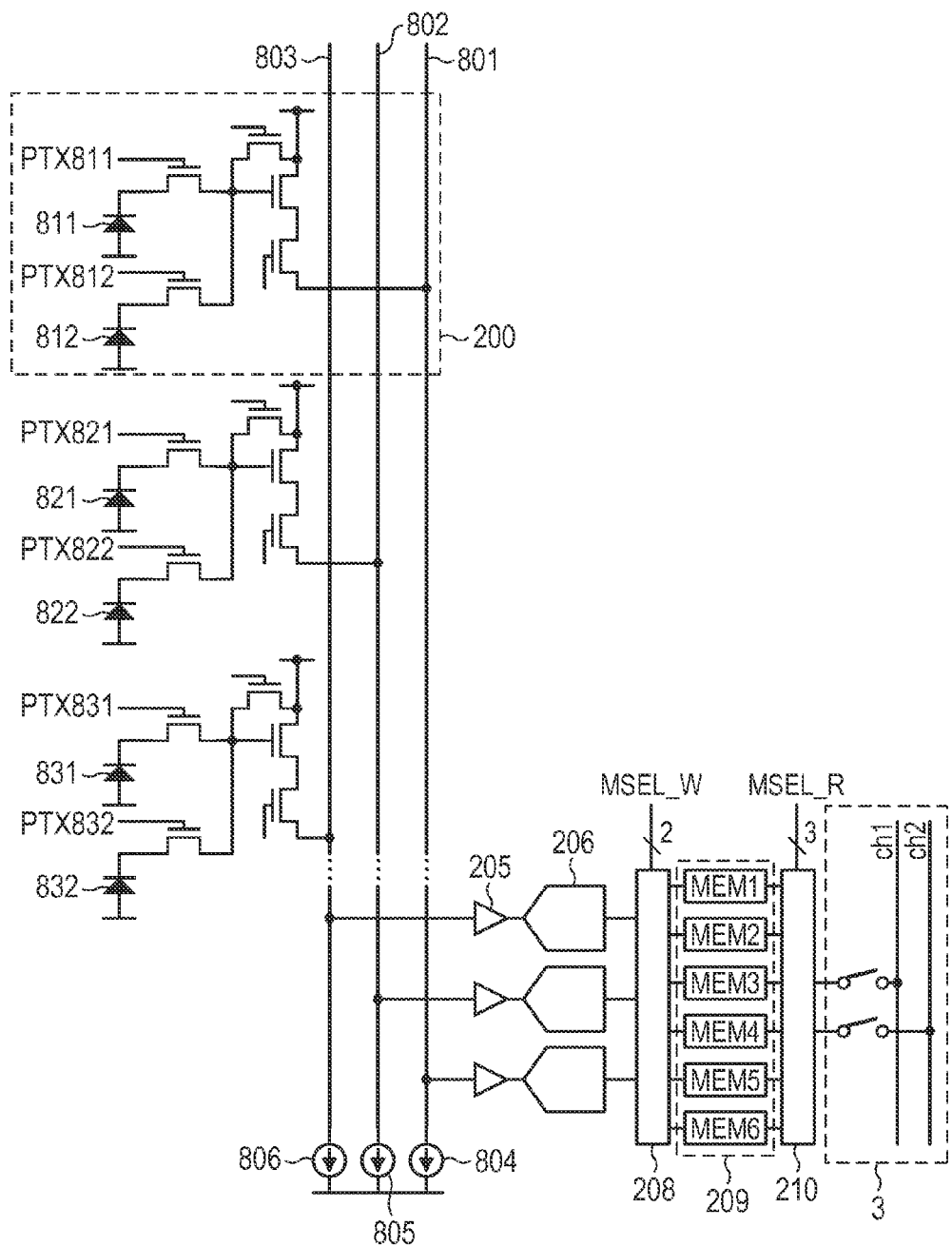
FIG. 8 is a diagram illustrating an exemplary circuit for describing drive timings according to a third embodiment of the present invention.

FIG. 8 is a diagram illustrating an exemplary circuit for describing drive timings according to the third embodiment. Three vertical output lines 801, 802, and 803 are connected to each column of unit pixels. Six memories 209 (MEM1 to MEM6) are mounted for each column of pixels. Two reading lines are connected from the memory portion 207 to the horizontal scanning circuit, which are connected to ch1 and ch2.

Figure 9:
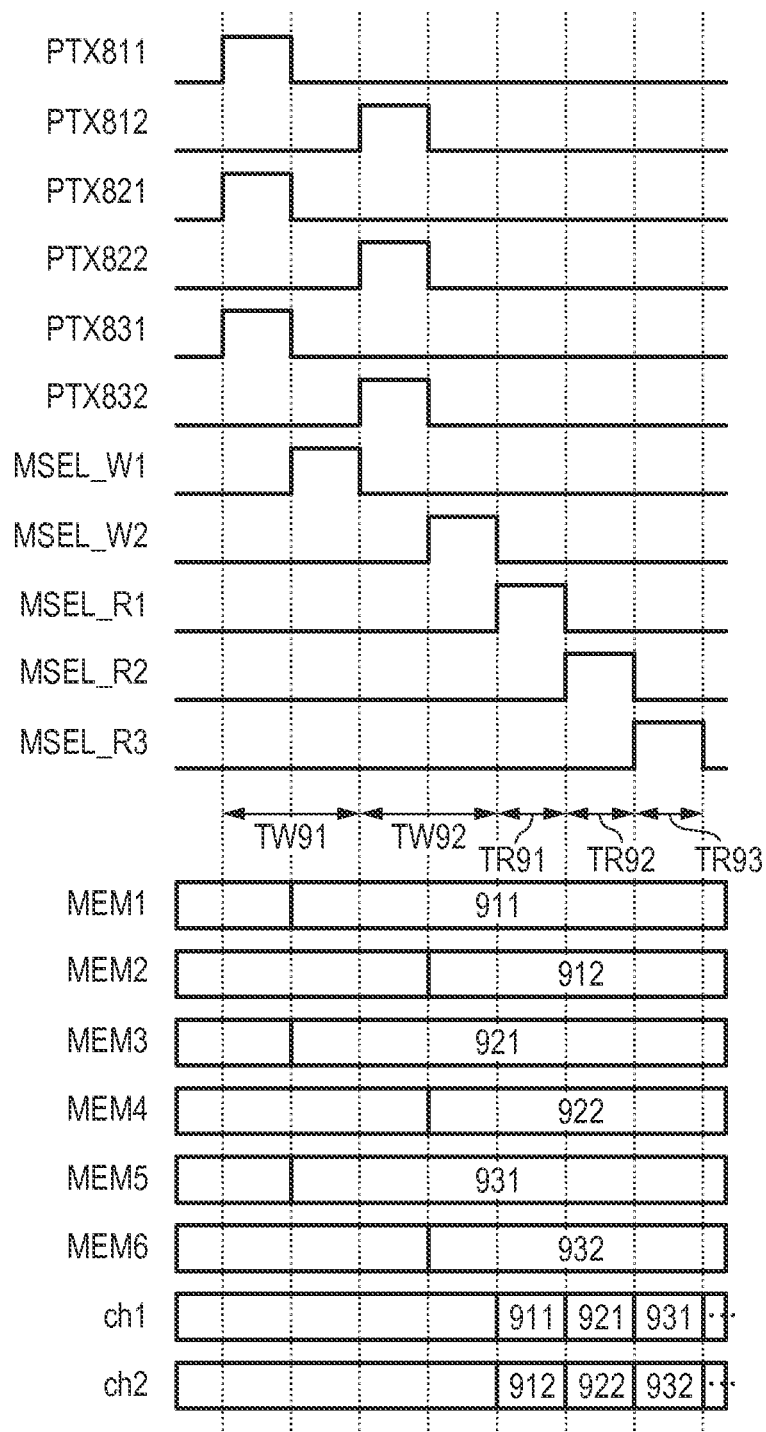
FIG. 9 is a diagram illustrating the drive timings according to the third embodiment of the present invention.

FIG. 9 is a timing chart illustrating the drive timings according to this embodiment. The drive timings are represented in the same manner as in the first embodiment. Numbers 911 to 932 described in a transition diagram of MEM1 to MEM6 and the horizontal scanning channels ch1 and ch2 represent pixel signals corresponding to photoelectric conversion elements 811 to 832 of FIG. 8, respectively. Note that, in FIGS. 8 and 9, the pixel portion reset signal PRES and the pixel selecting signal PSEL are omitted for simplicity. Note that, the timing chart of FIG. 9 is a schematic diagram for describing this embodiment, and is not intended to limit the actual timings of pulses for controlling the memory portion 207.

Table 3 shows correspondence relationships of the selection of MEM1 to MEM6 for storing signals from the vertical output lines 801, 802, and 803 controlled by MSEL_W1 and MSEL_W2 and the reading of signals from MEM1 to MEM6 to ch1 and ch2 controlled by MSEL_R1 to MSEL_R3 according to this embodiment. Note that, a plurality of pieces of processing are shown as the processing of signal writing or reading in correspondence with the respective control signals, which means that all operations of the pieces of processing are performed.

TABLE 3

| Control signal | Contents of control |
| --- | --- |
| MSEL_W1 | Write signal of vertical output line 801 into MEM1 |
|  | Write signal of vertical output line 802 into MEM3 |
|  | Write signal of vertical output line 803 into MEM5 |
| MSEL_W2 | Write signal of vertical output line 801 into MEM2 |
|  | Write signal of vertical output line 802 into MEM4 |
|  | Write signal of vertical output line 803 into MEM6 |
| MSEL_R1 | Read signal of MEM1 to ch1 |
|  | Read signal of MEM2 to ch2 |
| MSEL_R2 | Read signal of MEM3 to ch1 |
|  | Read signal of MEM4 to ch2 |
| MSEL_R3 | Read signal of MEM5 to ch1 |
|  | Read signal of MEM6 to ch2 |

In a period TW91, PTX811, PTX821, and PTX831 become High so that the pixel signals 911, 921, and 931 are read from the photoelectric conversion elements 811, 821, and 831, respectively. At this time, the writing memory selecting signal MSEL_W1 becomes High so that the pixel signal 911 is written into MEM1, the pixel signal 921 is written into MEM3, and the pixel signal 931 is written into MEM5.

In a period TW92, PTX812, PTX822, and PTX832 become High so that the pixel signals 912, 922, and 932 are read from the photoelectric conversion elements 812, 822, and 832, respectively. At this time, the writing memory selecting signal MSEL_W2 becomes High so that the pixel signal 912 is written into MEM2, the pixel signal 922 is written into MEM4, and the pixel signal 932 is written into MEM6.

In a period TR91, the reading memory selecting signal MSEL_R1 becomes High so that the pixel signal 911 is read from MEM1 and the pixel signal 912 is read from MEM2.

In a period TR92, the reading memory selecting signal MSEL_R2 becomes High so that the pixel signal 921 is read from MEM3 and the pixel signal 922 is read from MEM4.

In a period TR93, the reading memory selecting signal MSEL_R3 becomes High so that the pixel signal 931 is read from MEM5 and the pixel signal 932 is read from MEM6.

In this embodiment, pixel signals are read from the pixel portion 1 in the following order. First, signals are simultaneously read from the photoelectric conversion elements 811, 821, and 831. Second, signals are simultaneously read from the photoelectric conversion elements 812, 822, and 832. Signals are simultaneously read from three rows of the vertical output lines 801, 802, and 803, and hence the reading is performed at high speed. On the other hand, pixel signals are read from the memory portion to the horizontal scanning circuit in the following order. First, the pixel signals 911 and 912 are simultaneously read. Second, the pixel signals 921 and 922 are simultaneously read. Third, the pixel signals 931 and 932 are simultaneously read. In other words, pixel signals are simultaneously read from adjacent pixels.

According to this embodiment, through the switching of the order of writing and reading into and from the memories 209 in the memory portion 207, the signals output from the pixel portion 1 can be read as indicated by spatial information and be output to the horizontal scanning circuit 3.

Fourth Embodiment

Next, a fourth embodiment of the present invention is described. A solid state imaging apparatus according to this embodiment is the same as the solid state imaging apparatus according to the first embodiment described above, except for the configuration of the pixel portion, the configuration of the memory portion, and the drive method. Thus, parts that are different from the first embodiment are described below.

Figure 10:
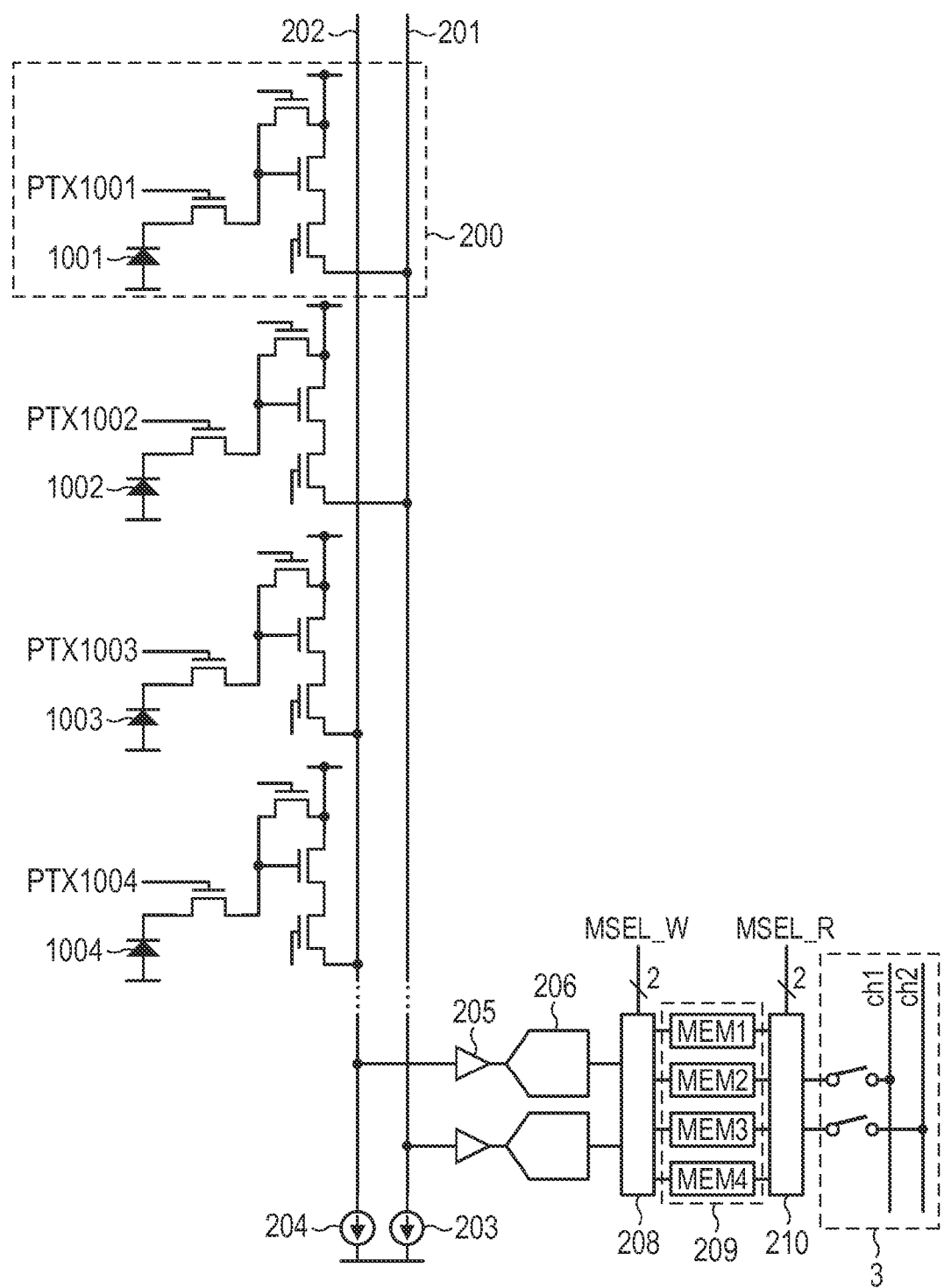
FIG. 10 is a diagram illustrating an exemplary circuit for describing drive timings according to a fourth embodiment of the present invention.

FIG. 10 is a diagram illustrating an exemplary circuit for describing drive timings according to the fourth embodiment. Two vertical output lines 201 and 202 are connected to each column of unit pixels in which each pixel includes a single floating diffusion portion FD.

Further, a color filter is provided on each photoelectric conversion element. Color filters of the same color are provided on photoelectric conversion elements 1001 and 1003. Color filters of the same color are provided on photoelectric conversion elements 1002 and 1004, which are different in color from the color filters of the photoelectric conversion elements 1001 and 1003. In other words, the photoelectric conversion elements are arranged so that photoelectric conversion elements of the same color are connected to different vertical output lines and pixel signals thereof are simultaneously read.

If the outputs of the photoelectric conversion element 1001 and the photoelectric conversion element 1002 are connected to different vertical output lines so that pixel signals thereof are simultaneously read, the pixel signals may be simultaneously read for the number of connected vertical output lines in the order as indicated by spatial information. As described below, however, this configuration may be difficult to achieve depending on other factors.

For example, in a solid state imaging apparatus in which a color filter arranged in the Bayer arrangement is provided, a red pixel and a green pixel or a blue pixel and a green pixel are adjacent to each other. If pixel signals are simultaneously read from adjacent pixels, the problem of color mixture or the like occurs due to crosstalk between vertical output lines. It is therefore preferred to simultaneously read pixel signals from pixels of the same color. Thus, the outputs of the photoelectric conversion element 1001 and the photoelectric conversion element 1003 of the same color are connected to different vertical output lines in some cases in order to reduce the fear of color mixture. In this case, the outputs of the adjacent photoelectric conversion element 1001 and photoelectric conversion element 1002 are connected to the same vertical output line.

Further, in a case where signals output from pixels of the same color arranged in the vertical direction are subjected to calculation processing with use of amplifiers arranged for each column simultaneously with the reading of the signals from the pixels, the pixels of the same color are connected to the same vertical output line.

According to this embodiment, the "reading as indicated by spatial information" is realized also in the above-mentioned configuration in which photoelectric conversion elements of the same color are connected to different vertical output lines.

Figure 11:
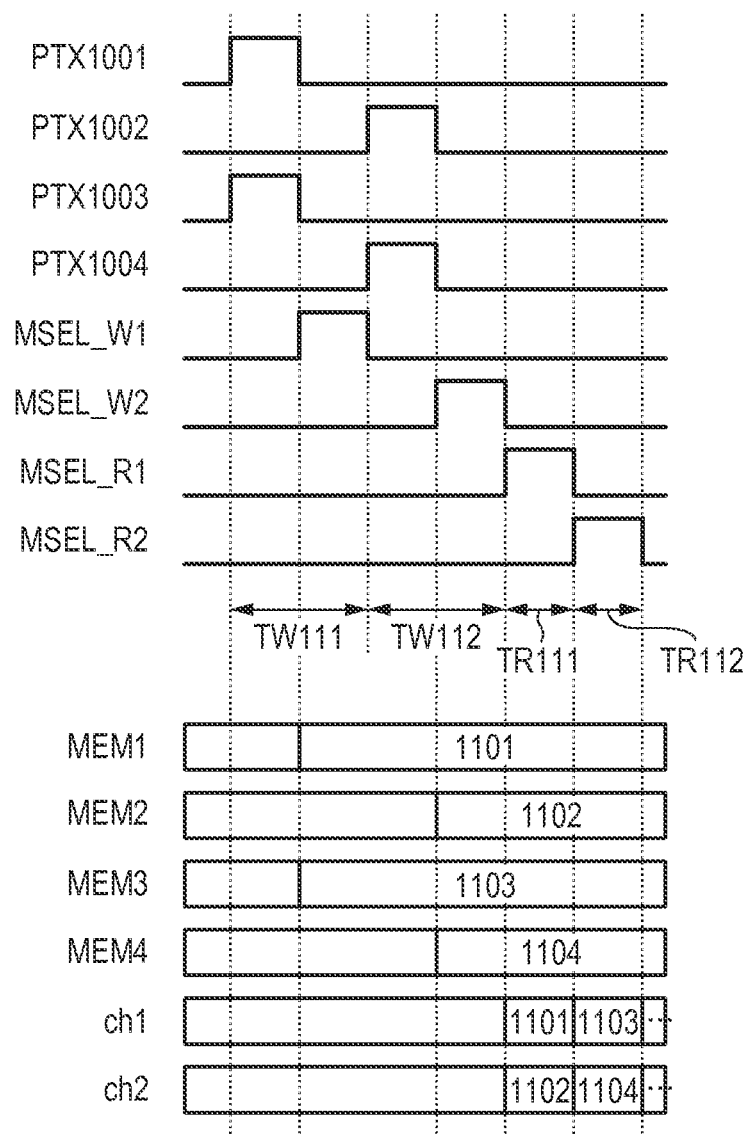
FIG. 11 is a diagram illustrating the drive timings according to the fourth embodiment of the present invention.

FIG. 11 is a timing chart illustrating the drive timings according to this embodiment. The drive timings are represented in the same manner as in the first embodiment. Numbers 1101 to 1104 described in a transition diagram of MEM1 to MEM4 and the horizontal scanning channels ch1 and ch2 represent pixel signals corresponding to the photoelectric conversion elements 1001 to 1004 of FIG. 10, respectively. Note that, in FIGS. 10 and 11, the pixel portion reset signal PRES and the pixel selecting signal PSEL are omitted for simplicity. Note that, the timing chart of FIG. 11 is a schematic diagram for describing this embodiment, and is not intended to limit the actual timings of pulses for controlling the memory portion 207.

Table 4 shows correspondence relationships of the selection of MEM1 to MEM4 for storing signals from the vertical output lines 201 and 202 controlled by MSEL_W1 and MSEL_W2 and the reading of signals from MEM1 to MEM4 to ch1 and ch2 controlled by MSEL_R1 and MSEL_R2 according to this embodiment. Note that, a plurality of pieces of processing are shown as the processing of signal writing or reading in correspondence with the respective control signals, which means that all operations of the pieces of processing are performed.

TABLE 4

| Control signal | Contents of control |
|---|---|
| MSEL_W1 | Write signal of vertical output line 201 into MEM1 |
| | Write signal of vertical output line 202 into MEM3 |
| MSEL_W2 | Write signal of vertical output line 201 into MEM2 |
| | Write signal of vertical output line 202 into MEM4 |
| MSEL_R1 | Read signal of MEM1 to ch1 |
| | Read signal of MEM2 to ch2 |
| MSEL_R2 | Read signal of MEM3 to ch1 |
| | Read signal of MEM4 to ch2 |

In a period TW111, PTX1001 and PTX1003 become High so that the pixel signals 1101 and 1103 are read from the photoelectric conversion elements 1001 and 1003, respectively. At this time, the writing memory selecting signal MSEL_W1 becomes High so that the pixel signal 1101 is written into MEM1 and the pixel signal 1103 is written into MEM3.

In a period TW112, PTX1002 and PTX1004 become High so that the pixel signals 1102 and 1104 are read from the photoelectric conversion elements 1002 and 1004, respectively. At this time, the writing memory selecting signal MSEL_W2 becomes High so that the pixel signal 1102 is written into MEM2 and the pixel signal 1104 is written into MEM4.

In a period TR111, the reading memory selecting signal MSEL_R1 becomes High so that the pixel signal 1101 is read from MEM1 and the pixel signal 1102 is read from MEM2.

In a period TR112, the reading memory selecting signal MSEL_R2 becomes High so that the pixel signal 1103 is read from MEM3 and the pixel signal 1104 is read from MEM4.

In this embodiment, pixel signals are read from the pixel portion 1 in the following order. First, signals are simultaneously read from the photoelectric conversion elements 1001 and 1003. Second, signals are simultaneously read from the photoelectric conversion elements 1002 and 1004. Signals are simultaneously read from two rows of the vertical output lines 201 and 202, and hence the reading is performed at high speed. On the other hand, pixel signals are read from the memory portion to the horizontal scanning circuit in the following order. First, the pixel signals 1001 and 1002 are simultaneously read. Second, the pixel signals 1003 and 1004 are simultaneously read. In other words, pixel signals are simultaneously read from adjacent pixels.

According to this embodiment, the order of writing and reading into and from the memories 209 is switched in the memory portion 207. With this, the "reading as indicated by spatial information" is provided in the configuration in which photoelectric conversion elements of the same color are connected to different vertical output lines. Consequently, the "reading as indicated by spatial information" and the reduction of mixed color due to crosstalk between vertical output lines can both be achieved, and the signals output from the pixels of the same color can be subjected to calculation processing with use of the amplifiers arranged for each column simultaneously with the reading of the signals from the pixels.

Fifth Embodiment

Next, a fifth embodiment of the present invention is described. A solid state imaging apparatus according to this embodiment is the same as the solid state imaging apparatus according to the above-mentioned first embodiment, except for the configuration of the pixel portion, the configuration of the signal processing unit, and the drive method. Thus, parts that are different from the first embodiment are described below.

The pixel portion and the signal processing unit according to this embodiment are driven in two kinds of modes, that is, a first mode and a second mode. The first mode is a mode of connecting one column of unit pixels to one vertical output line so as to sequentially read pixel signals from the unit pixels. The second mode is a mode of connecting one column of unit pixels to two vertical output lines so as to simultaneously read pixel signals from two rows of unit pixels.

Figure 12:
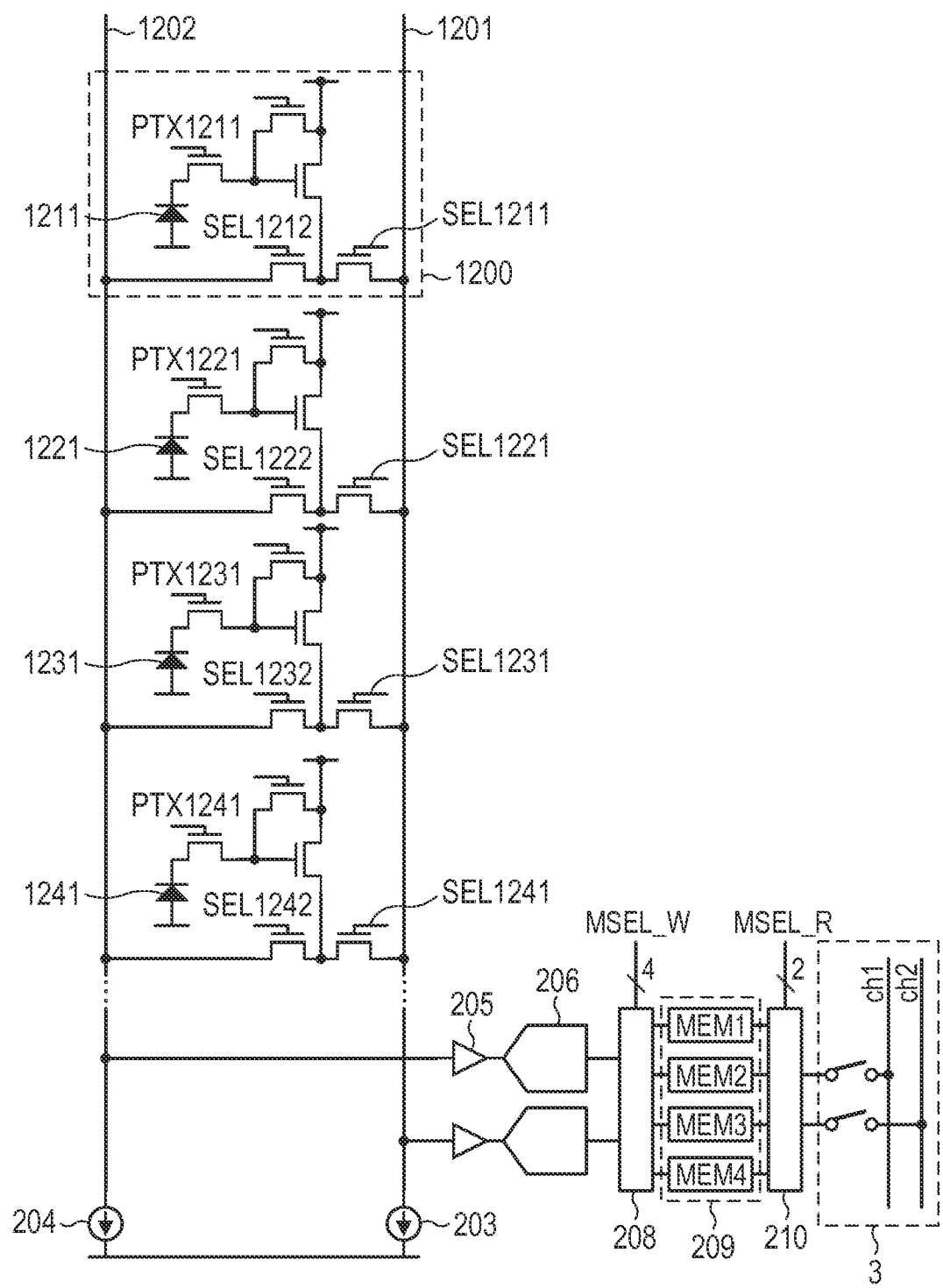
FIG. 12 is a diagram illustrating an exemplary circuit for describing drive timings according to a fifth embodiment of the present invention.

FIG. 12 is a diagram illustrating an exemplary circuit for describing drive timings according to the fifth embodiment. Two vertical output lines 1201 and 1202 are connected to each column of unit pixels 1200. Each unit pixel 1200 includes two switches serving as vertical output line selecting units for selecting which of the vertical output lines 1201 and 1202 is to be connected. The respective switches are controlled to be on/off by control signals SEL1211 to SEL1242.

Figure 13A:
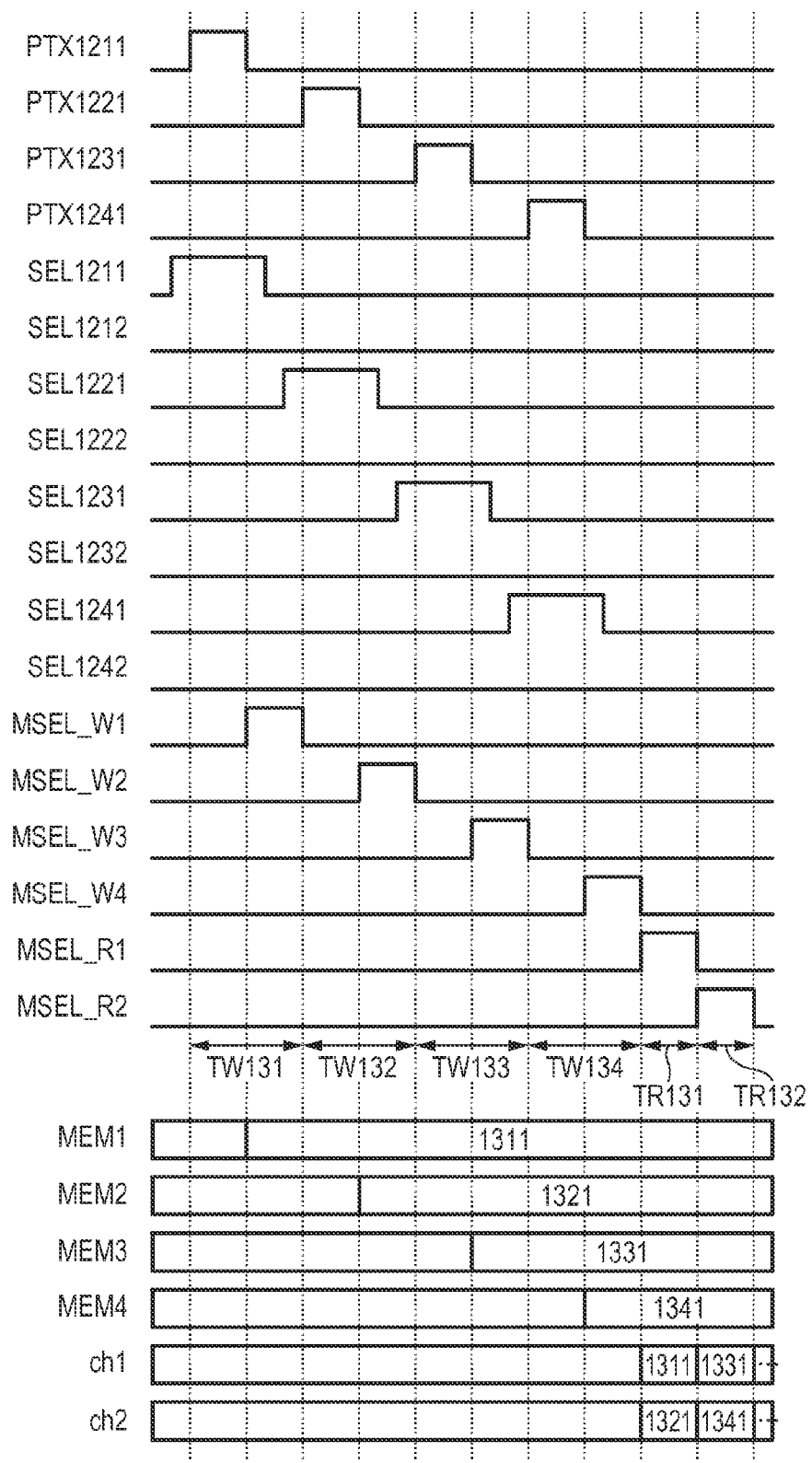
FIG. 13A is a diagram illustrating drive timings in a first mode according to the fifth embodiment of the present invention.
Figure 13B:
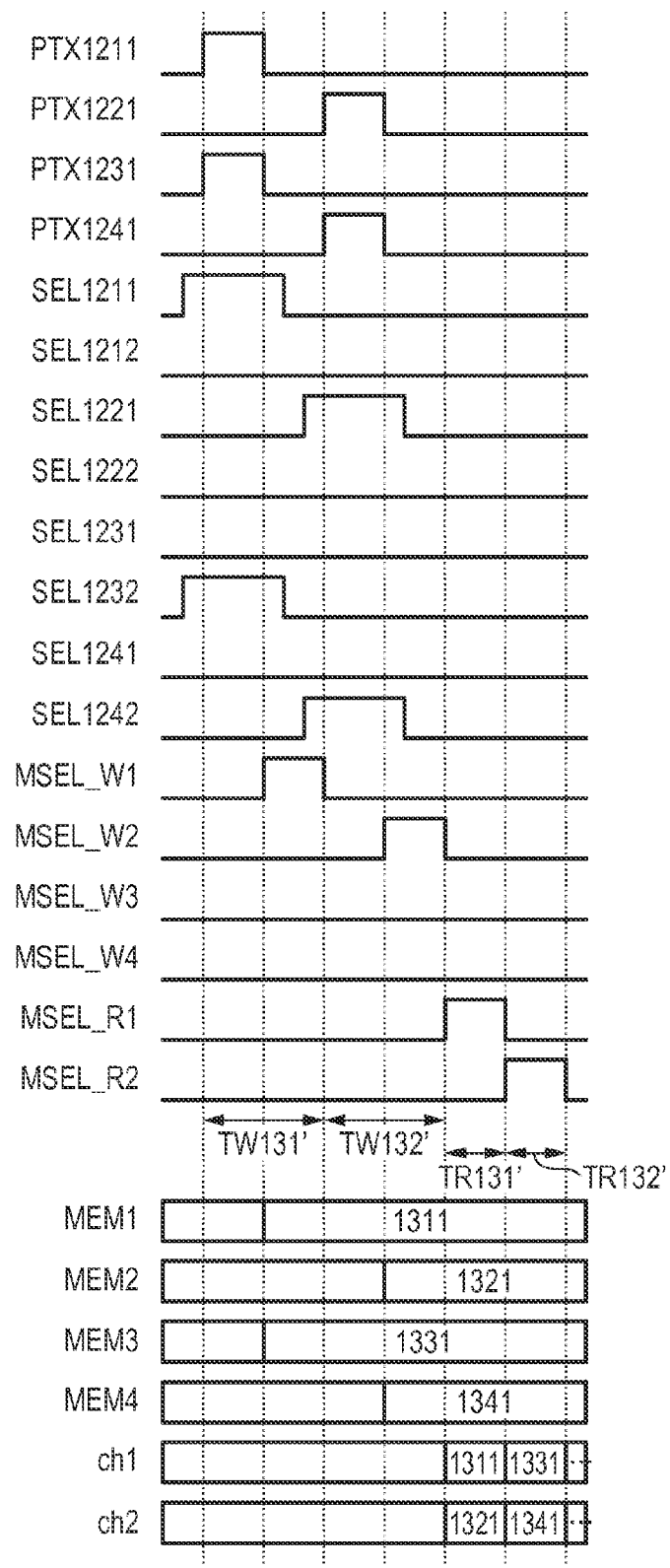
FIG. 13B is a diagram illustrating drive timings in a second mode according to the fifth embodiment of the present invention.

FIGS. 13A and 13B are timing charts illustrating the drive timings according to this embodiment. The drive timings are represented in the same manner as in the first embodiment. FIG. 13A illustrates the drive timings in the first mode, and FIG. 13B illustrates the drive timings in the second mode. Numbers 1311 to 1341 described in a transition diagram of MEM1 to MEM4 and the horizontal scanning channels ch1 and ch2 represent pixel signals corresponding to photoelectric conversion elements 1211 to 1241 of FIG. 12, respectively. Note that, in FIGS. 12, 13A, and 13B, a switching unit and/or a switching control signal relating to the switching between the first mode and the second mode and the pixel portion reset signal PRES are omitted for simplicity. Note that, the timing charts of FIGS. 13A and 13B are schematic diagrams for describing this embodiment, and are not intended to limit the actual timings of pulses for controlling the memory portion 207.

Table 5 shows correspondence relationships of the selection of MEM1 to MEM4 for storing signals from the vertical output lines 1201 and 1202 controlled by MSEL_W1 to MSEL_W4 and the reading of signals from MEM1 to MEM4 to ch1 and ch2 controlled by MSEL_R1 and MSEL_R2 according to this embodiment. Note that, a plurality of pieces of processing are shown as the processing of signal writing or reading in correspondence with the respective control signals, which means that all operations of the pieces of processing are performed.

TABLE 5

| Control signal | Contents of control |
| --- | --- |
| MSEL_W1 | Write signal of vertical output line 1201 into MEM1 |
| | Write signal of vertical output line 1202 into MEM3 |
| MSEL_W2 | Write signal of vertical output line 1201 into MEM2 |
| | Write signal of vertical output line 1202 into MEM4 |
| MSEL_W3 | Write signal of vertical output line 1201 into MEM3 |
| MSEL_W4 | Write signal of vertical output line 1201 into MEM4 |
| MSEL_R1 | Read signal of MEM1 to ch1 |
| | Read signal of MEM2 to ch2 |
| MSEL_R2 | Read signal of MEM3 to ch1 |
| | Read signal of MEM4 to ch2 |

The drive in the first mode illustrated in FIG. 13A is now described. In a period TW131, SEL1211 and PTX1211 become High so that the pixel signal 1311 is read from the photoelectric conversion element 1211. At this time, the writing memory selecting signal MSEL_W1 becomes High so that the pixel signal 1311 is written into MEM1.

In a period TW132, SEL1221 and PTX1221 become High so that the pixel signal 1321 is read from the photoelectric conversion element 1221. At this time, the writing memory selecting signal MSEL_W2 becomes High so that the pixel signal 1321 is written into MEM2.

In a period TW133, SEL1231 and PTX1231 become High so that the pixel signal 1331 is read from the photoelectric conversion element 1231. At this time, the writing memory selecting signal MSEL_W3 becomes High so that the pixel signal 1331 is written into MEM3.

In a period TW134, SEL1241 and PTX1241 become High so that the pixel signal 1341 is read from the photoelectric conversion element 1241. At this time, the writing memory selecting signal MSEL_W4 becomes High so that the pixel signal 1341 is written into MEM4.

In a period TR131, the reading memory selecting signal MSEL_R1 becomes High so that the pixel signal 1311 is read from MEM1 and the pixel signal 1321 is read from MEM2.

In a period TR132, the reading memory selecting signal MSEL_R2 becomes High so that the pixel signal 1331 is read from MEM3 and the pixel signal 1341 is read from MEM4.

In the first mode, the signals are read from the vertical output line 1201 in the order as indicated by spatial information, and hence the order of writing and reading with use of the memories 209 is not switched.

The drive in the second mode illustrated in FIG. 13B is now described. In a period TW131', SEL1211, PTX1211, SEL1232, and PTX1231 become High so that the pixel signals 1311 and 1331 are read from the photoelectric conversion elements 1211 and 1231. At this time, the writing memory selecting signal MSEL_W1 becomes High so that the pixel signal 1311 is written into MEM1 and the pixel signal 1331 is written into MEM3.

In a period TW132', SEL1221, PTX1221, SEL1242, and PTX1241 become High so that the pixel signals 1321 and 1341 are read from the photoelectric conversion elements 1221 and 1241. At this time, the writing memory selecting signal MSEL_W2 becomes High so that the pixel signal 1321 is written into MEM2 and the pixel signal 1341 is written into MEM4.

In a period TR131', the reading memory selecting signal MSEL_R1 becomes High so that the pixel signal 1311 is read from MEM1 and the pixel signal 1321 is read from MEM2.

In a period TR132', the reading memory selecting signal MSEL_R2 becomes High so that the pixel signal 1331 is read from MEM3 and the pixel signal 1341 is read from MEM4.

Specifically, particularly in the second mode, the order of writing and reading into and from the memories 209 is switched in the memory portion 207, to thereby realize the reading as indicated by spatial information.

In the first mode, the drive of the constant current source 204 and the drive of the amplifier 205 and the AD converter 206 for each column, which are connected to the vertical output line 1202 connected to SEL1212 and the like, can be stopped. In this way, power consumption can be reduced. Signals are read from only one vertical output line 1201, and hence the first mode is suitable as a low-speed reading mode.

In the second mode, on the other hand, signals are read from a plurality of vertical output lines similarly to the first to fourth embodiments, and hence the reading is performed at high speed. In other words, the second mode is suitable as a high-speed reading mode for reading signals in a short period of time.

The different drive modes can be used depending on the purpose, for example, the first mode can be used as a low power consumption mode with full high definition (full HD) 30 frames per seconds (fps) and the second mode can be used as a high speed mode with full HD 60 fps. In this way, the single solid state imaging apparatus can be used in two modes in a switchable manner simply through the change of the drive timings.

Note that, in the second mode, processing of adding pixel signals in a different pixel column or processing of thinning pixel signals in some pixel columns may be performed on the upstream side of the memory portion 207. With this, spatial information in the horizontal direction can be compressed or reduced to decrease the number of memories 209.

According to the solid state imaging apparatus according to the first to fifth embodiments described above, pixel signals are read in the order that matches with the spatial arrangement of pixels. Consequently, there is no need to sort data with use of an external digital signal processing circuit, and image processing can be efficiently performed.

Note that, in the first to third and fifth embodiments, each photoelectric conversion element may or may not include a color filter. In the case where the photoelectric conversion element includes a color filter, color imaging can be achieved by a color arrangement such as the Bayer arrangement. In the case where the photoelectric conversion element includes no color filter, color imaging can be achieved by another method such as a 3-chip color sensor, or alternatively, this configuration can be used as a monochrome sensor. In any case, the embodiments can be applied to obtain similar effects.

In the first to fifth embodiments, there have been described only the examples in which the order of the output signals completely matches with the spatial arrangement. Alternatively, however, the embodiments may be modified so that the order of a part or all of the signals does not match with the spatial arrangement. For example, the order of signals may be set partially as indicated by spatial information. Also in this case, all or a part of the effects of the embodiments of the present invention can be obtained.

Sixth Embodiment

Figure 14:
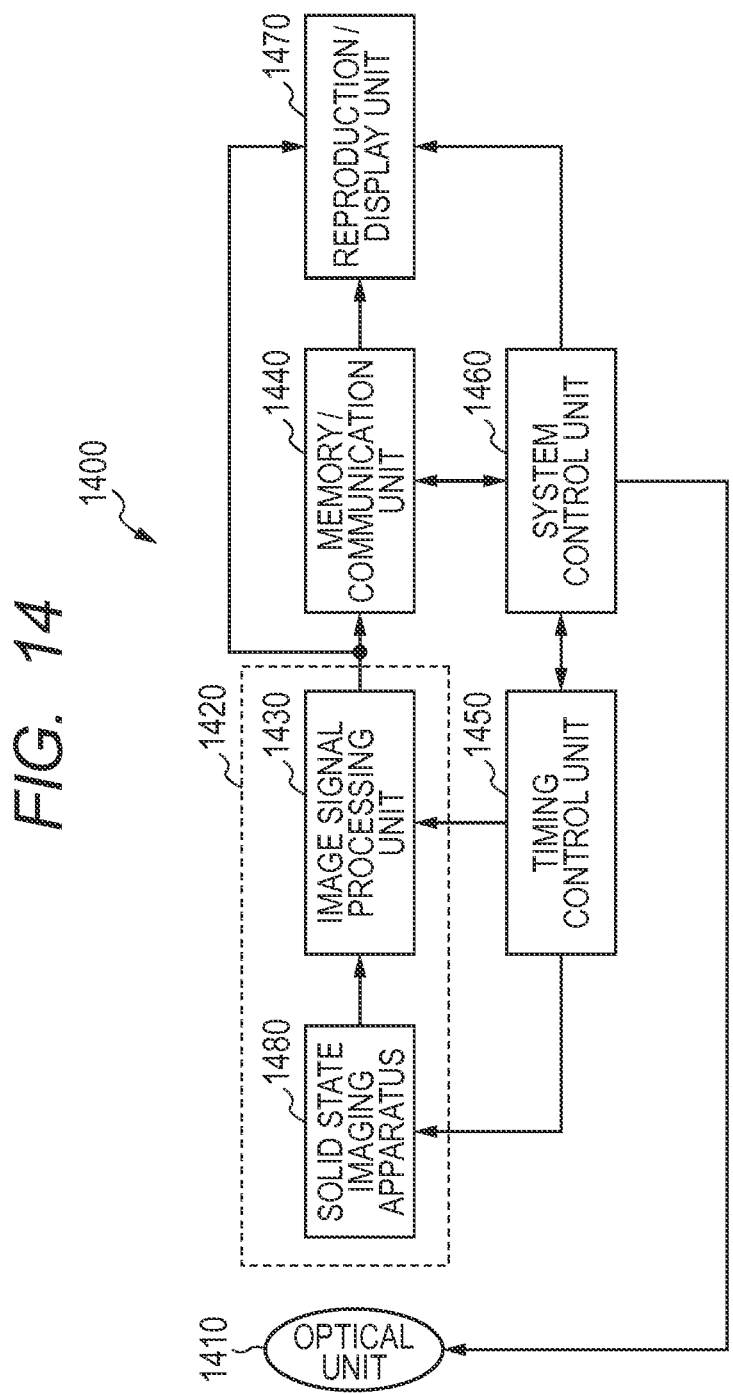
FIG. 14 is a diagram illustrating a configuration of an imaging system according to a sixth embodiment of the present invention.

FIG. 14 is a diagram illustrating a configuration of an imaging system using an imaging element according to a sixth embodiment of the present invention. An imaging system 1400 includes an optical unit 1410, an imaging apparatus 1420, a memory/communication unit 1440, a timing control unit 1450, a system control unit 1460, and a reproduction/display unit 1470. The imaging apparatus 1420 includes a solid state imaging apparatus 1480 and an image signal processing unit 1430. As the solid state imaging apparatus 1480, the solid state imaging apparatus described in the above-mentioned first to fifth embodiments is used.

The optical unit 1410, which is an optical system such as a lens, forms an image of light from a subject on the pixel portion 1 of the solid state imaging apparatus 1480 in which a plurality of pixels are two-dimensionally arranged, to thereby form an image of the subject. The solid state imaging apparatus 1480 outputs a signal corresponding to the light whose image is formed on the pixel portion 1 at the timing based on a signal transmitted from the timing control unit 1450. The signal output from the solid state imaging apparatus 1480 is input to the image signal processing unit 1430. The image signal processing unit 1430 performs signal processing, such as conversion of the input signal into image data, in accordance with a method determined by a program or the like. The signal obtained through the processing in the image signal processing unit 1430 is transmitted to the memory/communication unit 1440 as image data. The memory/communication unit 1440 transmits a signal for forming an image to the reproduction/display unit 1470, to thereby cause the reproduction/display unit 1470 to reproduce or display a moving image or a still image. Further, in response to the signal from the image signal processing unit 1430, the memory/communication unit 1440 communicates to/from the system control unit 1460 and records the signal for forming an image in a recording medium (not shown).

The system control unit 1460 controls the operation of the imaging system in a comprehensive manner, and controls the drive of the optical unit 1410, the timing control unit 1450, the memory/communication unit 1440, and the reproduction/display unit 1470. The system control unit 1460 includes a memory device (not shown), such as a recording medium. A program and the like necessary for controlling the operation of the imaging system are recorded in the memory device. The system control unit 1460 supplies the imaging system with a signal for switching a drive mode in accordance with a user's operation, for example. Specifically, the system control unit 1460 supplies the imaging system with a signal for performing switching, such as the change of a row to be read or a row to be reset, the change of the angle of view accompanying electronic zooming, and the shift of the angle of view accompanying electronic image stabilization. The timing control unit 1450 controls drive timings of the solid state imaging apparatus 1480 and the image signal processing unit 1430 based on the control by the system control unit 1460.

The solid state imaging apparatus 1480 according to this embodiment is capable of reading pixel signals in the order that matches with the spatial arrangement of pixels, and hence the image processing can be efficiently performed without the need of sorting data with use of an external digital signal processing circuit. Consequently, by mounting the solid state imaging apparatus 1480 according to this embodiment, the imaging system 1400 capable of high-speed processing can be implemented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-015734, filed Jan. 30, 2014, which is hereby incorporated by reference herein in its entirety.

What is claimed is:

1. A solid state imaging apparatus, comprising:
a pixel portion comprising a plurality of unit pixels arranged in matrix,
the plurality of unit pixels each comprising a photoelectric conversion element;
a plurality of vertical output lines arranged for each column of the pixel portion, configured to transmit signals output from the photoelectric conversion elements,
a plurality of memories configured to store the signals output from the photoelectric conversion elements;
a writing memory selecting unit connected between the plurality of vertical output lines and the plurality of memories, configured to selectively store a signal transmitted from at least one of the plurality of vertical output lines into at least one of the plurality of memories;
a plurality of horizontal scanning channels configured to input the signals stored in the plurality of memories; and
a reading memory selecting unit connected between the plurality of memories and the plurality of horizontal scanning channels, configured to selectively output the signal stored in the at least one of the plurality of memories to at least one of the plurality of horizontal scanning channels,
the reading memory selecting unit being configured to output the signals in an order corresponding to spatial arrangement of the photoelectric conversion elements.

2. A solid state imaging apparatus according to claim 1, wherein:
the plurality of unit pixels each comprise a plurality of the photoelectric conversion elements; and
the signals output from the plurality of the photoelectric conversion elements are read as a group.

3. A solid state imaging apparatus according to claim 1, wherein:
the plurality of unit pixels each comprise a plurality of the photoelectric conversion elements, a pixel amplifying portion, and an electric charge transfer unit; and
the plurality of the photoelectric conversion elements are each connected to the pixel amplifying portion via the electric charge transfer unit.

4. A solid state imaging apparatus according to claim 1, wherein the order of outputting the signals stored in the plurality of memories from the reading memory selecting unit matches with an order of the photoelectric conversion elements in a direction along the column.

5. A solid state imaging apparatus according to claim 1, further comprising color filters of a plurality of colors,
wherein the plurality of unit pixels each correspond to one unit of a color arrangement of the color filters.

6. A solid state imaging apparatus according to claim 1, further comprising color filters of a plurality of colors,
wherein the reading memory selecting unit is controlled so that signals from photoelectric conversion elements including color filters of the same color are simultaneously output.

7. A solid state imaging apparatus according to claim 1, further comprising a vertical output line selecting unit configured to select only one of the plurality of vertical output lines to read a signal therefrom, to thereby match an order of signals to be transmitted from the plurality of vertical output lines and an order of signals to be output from the reading memory selecting unit.

8. A solid state imaging apparatus according to claim 1, wherein the plurality of memories are larger in number than the plurality of vertical output lines.

9. A solid state imaging apparatus according to claim 1,
wherein the plurality of memories are each configured to store a plurality of signals, and
wherein the plurality of signals comprise at least a reset signal and a photoelectric conversion signal.

10. An imaging system, comprising:
the solid state imaging apparatus according to claim 1; and
an image signal processing unit configured to process a signal output from the solid state imaging apparatus.

* * * * *